(12) United States Patent
Seo et al.

(10) Patent No.: US 11,175,766 B2
(45) Date of Patent: Nov. 16, 2021

(54) DISPLAY APPARATUS

(71) Applicant: LG Display Co., Ltd., Seoul (KR)

(72) Inventors: ChangHwan Seo, Incheon (KR);
NamKyun Cho, Seoul (KR);
SeungChul Park, Paju-si (KR); Eunji Seo, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 44 days.

(21) Appl. No.: 16/212,124

(22) Filed: Dec. 6, 2018

(65) Prior Publication Data

US 2019/0179475 A1   Jun. 13, 2019

(30) Foreign Application Priority Data

Dec. 12, 2017   (KR) .......................... 10-2017-0170692

(51) Int. Cl.
*G06F 3/041* (2006.01)
*G06F 3/044* (2006.01)
*G06F 3/0354* (2013.01)
*G06F 3/038* (2013.01)
*G06F 3/033* (2013.01)

(52) U.S. Cl.
CPC .......... *G06F 3/0416* (2013.01); *G06F 3/0383* (2013.01); *G06F 3/03545* (2013.01); *G06F 3/044* (2013.01); *G06F 3/0442* (2019.05); *G06F 3/0443* (2019.05); *G06F 3/04186* (2019.05); *G06F 3/041661* (2019.05); *G06F 3/0412* (2013.01); *G06F 2203/04114* (2019.05)

(58) Field of Classification Search
CPC ....... G06F 2203/04114; G06F 3/03545; G06F 3/0383; G06F 3/0412; G06F 3/0416; G06F 3/041661; G06F 3/04186; G06F 3/044; G06F 3/0442; G06F 3/0443
USPC ................................................. 345/173–174
See application file for complete search history.

(56) References Cited

U.S. PATENT DOCUMENTS

| | | |
|---|---|---|
| 9,317,149 B2 | 4/2016 | Kim et al. |
| 9,658,720 B2 | 5/2017 | Kremin et al. |
| 2012/0105361 A1 | 5/2012 | Kremin et al. |
| 2012/0105362 A1 | 5/2012 | Kremin et al. |

(Continued)

FOREIGN PATENT DOCUMENTS

| | | |
|---|---|---|
| KR | 10-2011-0057384 A | 6/2011 |
| KR | 10-1158650 B | 6/2012 |
| KR | 10-2013-0108614 A | 10/2013 |

*Primary Examiner* — Kwin Xie
(74) *Attorney, Agent, or Firm* — Fenwick & West LLP

(57) ABSTRACT

Disclosed is a display apparatus capable of sensing a pen touch without malfunction even when a user's hand or palm touches the display apparatus. The display apparatus includes a touch driving circuit dividing a plurality of touch electrodes arranged in a display panel into a plurality of touch groups, supplying a common voltage to the plurality of touch electrodes at each of a plurality of display periods, and sensing a position of a touch pen through some of the plurality of touch electrodes at each of a plurality of pen sensing periods, wherein the touch driving circuit supplies an uplink signal to some of the plurality of touch groups at each of at least one pen position sensing period among the plurality of pen sensing periods and senses a downlink signal transmitted from the touch pen through the touch groups to which the uplink signal has been supplied to generate pen touch raw data.

21 Claims, 13 Drawing Sheets

(56) References Cited

U.S. PATENT DOCUMENTS

| | | | |
|---|---|---|---|
| 2013/0278535 A1 | 10/2013 | Kim et al. | |
| 2013/0314343 A1* | 11/2013 | Cho | G06F 3/0416 |
| | | | 345/173 |
| 2014/0043284 A1* | 2/2014 | Park | G06F 3/044 |
| | | | 345/174 |
| 2017/0153752 A1* | 6/2017 | Kurasawa | G02F 1/13338 |
| 2017/0255295 A1* | 9/2017 | Tanemura | G06F 3/041662 |
| 2018/0024654 A1* | 1/2018 | Koike | G09G 3/20 |
| | | | 345/174 |
| 2018/0129312 A1* | 5/2018 | Westhues | G06F 3/041661 |
| 2018/0260077 A1* | 9/2018 | Westhues | G06F 3/0412 |
| 2018/0364854 A1* | 12/2018 | Ramakrishnan | G06F 3/04186 |
| 2019/0004664 A1* | 1/2019 | Zyskind | G06F 3/0418 |
| 2019/0102014 A1* | 4/2019 | Gur | G06F 3/0446 |

\* cited by examiner

DISPLAY APPARATUS

CROSS-REFERENCE TO RELATED APPLICATIONS

This application claims the benefit of the Korean Patent Application No. 10-2017-0170692 filed on Dec. 12, 2017, which is hereby incorporated by reference in its entirety.

BACKGROUND

Field of the Invention

The present disclosure relates to a display apparatus.

Discussion of the Related Art

With the development of the information society, demand for display apparatuses for displaying images has increased in various forms.

Electronic devices using a display apparatus as a display screen provide a touch screen type user interface for convenience of a user input. Display apparatuses enabling processing such a touch interface has advanced to provide various functions.

Recently, display apparatuses equipped with a touch panel enabling pen operation sensing through a touch pen (or a stylus pen), as well as finger touch sensing through a finger, or touch screen-integrated display apparatuses have widely been used. Such display apparatuses may be used as display screens of mobile electronic devices such as mobile phones, smartphones, smart watches, tablet personal computers (PCs), watch phones, or the like, and medium and large-sized electronic devices such as smart TVs, notebooks, monitors, or refrigerators.

The touch input method using a touch pen allows a fine input, relative to an input based on a finger, and thus, it is appropriate for touch drawing (or graphic operation) such as handwriting, sketching, detailed drawing, and the like.

However, when the touch input method is a touch pen, if the user's hand or palm touches a display panel, the user's body may act as a capacitor and a resistor attenuating a touch driving signal transmitted from the display panel to the touch pen, and thus, the touch pen may malfunction resulting in failure of pen sensing causing a touch drawing to be broken.

SUMMARY

Accordingly, the present disclosure is directed to providing a display apparatus that substantially obviates one or more problems due to limitations and disadvantages of the related art.

An aspect of the present disclosure is directed to providing a display apparatus capable of sensing a pen touch without malfunction even when a user's hand or palm touches the display apparatus.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

An embodiment of the present disclosure relates to a display apparatus including a display panel with a plurality of touch electrodes and a touch driving circuit dividing the plurality of touch electrodes into a plurality of touch groups. The touch electrodes are arranged in a plurality of rows and a plurality of columns. The plurality of touch groups each include a set of touch electrodes from the plurality of touch electrodes. The touch driving circuit supplies a common voltage to the plurality of touch electrodes at each of a plurality of display periods, during which an image is displayed on the display panel, and senses a position of a touch pen at each of a plurality of pen position sensing period.

During one or more of the plurality of pen position sensing periods, the touch driving circuit supplies an uplink signal to the set of touch electrodes of one of the plurality of touch groups that corresponds with the one or more pen position sensing periods, senses a touch of the touch pen through the set of touch electrodes supplied with the uplink signal, and senses a downlink signal transmitted from the touch pen in response to the uplink signal. The touch driving circuit generates pen touch raw data based on the downlink signal.

An embodiment of the present disclosure relates to a display apparatus including a display panel with a plurality of touch electrodes and a touch driving circuit dividing the plurality of touch electrodes into at least a first touch group and a second touch group. The touch electrodes are arranged in a plurality of rows and a plurality of columns. The first touch group and the second touch group each include a respective set of touch electrodes from the plurality of touch electrodes. The touch driving circuit supplies a common voltage to the plurality of touch electrodes at each of a plurality of display periods, during which an image is displayed on the display panel.

The touch driving circuit alternately supplies an uplink signal to the set of touch electrodes of the first touch group and the set of touch electrodes of the second touch group in units of frames or in units of pen position sensing periods, and a touch of the touch pen is sensed through the set of touch electrodes supplied with the uplink signal. The touch driving circuit generates pen touch raw data.

An embodiment of the present disclosure relates to a display apparatus including a display panel and a data/touch driving unit. The display panel includes a plurality of touch electrodes arranged in a plurality of rows and a plurality of columns, a plurality of gate lines overlapping the plurality of touch electrodes, and a plurality of data lines intersecting the plurality of gate lines.

The data/touch driving unit is connected to the plurality of touch electrodes and the plurality of data lines, divides the plurality of touch electrodes into a plurality of touch groups that each include a set of touch electrodes from the plurality of touch electrodes, supplies a common voltage to the plurality of touch electrodes at each of a plurality of display periods during which an image is displayed on the display panel, and senses a position of a touch at each of a plurality of pen position sensing periods. During one or more of the plurality of pen position sensing periods, the data/touch driving unit supplies an uplink signal to the set of touch electrodes of one of the plurality of touch groups that corresponds with the one or more pen position sensing periods, senses a touch of the touch pen through the set of touch electrodes supplied with the uplink signal, and senses a downlink signal transmitted from the touch pen in response to the uplink signal. The touch driving circuit generates pen touch raw data based on the downlink signal.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

Figure 1:
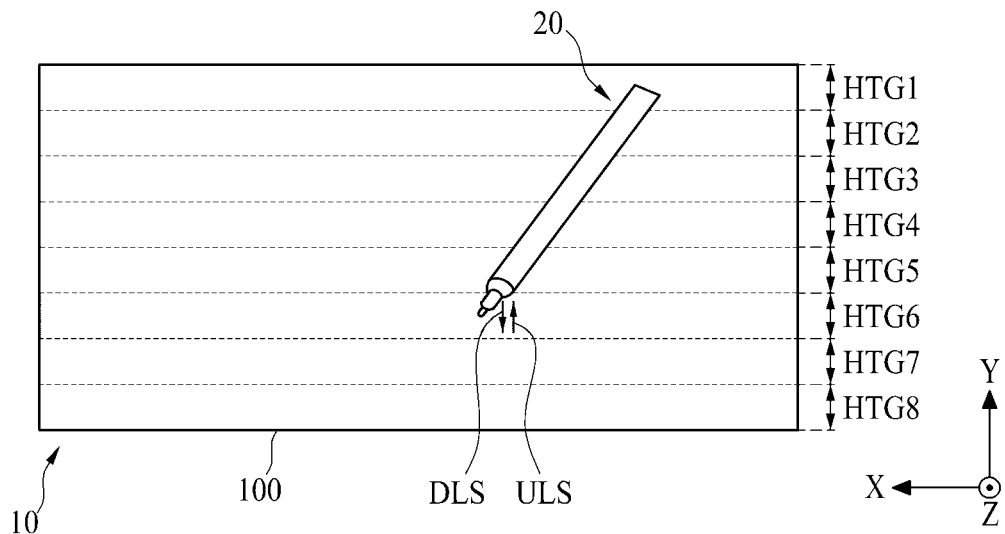
FIG. 1 is a view schematically illustrating pen sensing of a display apparatus according to an embodiment of the present disclosure.

Reference will now be made in detail to the embodiments of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known technology is determined to unnecessarily obscure the important point of the present disclosure, the detailed description will be omitted.

In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when a position relation between two parts is described as 'on~', 'over~', 'under~', and 'next~', one or more other parts may be disposed between the two parts unless 'just' or 'direct' is used.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, exemplary embodiments of a display apparatus of the present disclosure will be described in detail with reference to the accompanying drawings. In the specification, in adding reference numerals for elements in each drawing, it should be noted that like reference numerals already used to denote like elements in other drawings are used for elements wherever possible. In the following description, when the detailed description of the relevant known function or configuration is determined to unnecessarily obscure the important point of the present disclosure, the detailed description will be omitted.

FIG. 1 is a view schematically illustrating pen sensing of a display apparatus according to an embodiment of the present disclosure.

Referring to FIG. 1, in a display apparatus 10 according to an embodiment of the present disclosure, a display panel 100 is divided into a plurality of horizontal touch groups HTG1 to HTG8, an uplink signal ULS is transmitted to a touch pen 20 through sequential driving or horizontally partitioned driving, a downlink signal DLS is transmitted from the touch pen 20 in synchronization with the uplink signal ULS which the touch pen 20 has received through the horizontal touch group HTG6 to sense a position of the touch pen 20, an uplink signal ULS is transmitted on the basis of the position of the touch pen 20 through the horizontal touch group HTG6 in which the touch pen 20 is positioned, and a downlink signal DLS is transmitted from the touch pen 20, thus sensing a pen touch in a pen tracking manner. Here, a direct current (DC) current (or common voltage) is supplied to a horizontal touch group HTG1 to HTG5, HTG7, and HTG8 which has not transmitted the uplink signal ULS, among the plurality of touch groups HTG1 to HTG8. Here, the uplink signal may have a square wave having at least one pulse but is not limited thereto.

In the pen tracking method based on the position of the touch pen 20, the horizontal touch group HTG6 where the touch pen 20 is positioned may be set as a pen overlap horizontal touch group, or the horizontal touch group HTG6 where the touch pen is positioned and the neighboring horizontal touch groups HTG5 and HTG7 may be set as pen overlap horizontal touch groups. Thus, a pen touch may be sensed, while tracking the set pen overlap horizontal touch group(s).

The touch pen 20 may include a conductive tip formed of a conductive material such as a metal. The conductive tip serves as a reception electrode for receiving an uplink signal ULS including a pen setting signal or a pen driving signal (or a pen synchronization signal) transmitted from the display panel 100 or as a transmission electrode transmitting a downlink signal DLS including a pen position data signal or a pen operation data signal to the display panel 100. For example, the conductive tip is brought into contact with the display panel 100 and coupled with a touch electrode provided in the display panel 100 at a contact position to thus receive an uplink signal ULS supplied to the coupled touch electrode. Also, the conductive tip transmits a downlink signal DLS synchronized with the received uplink signal ULS to the coupled touch electrode.

In this manner, in the display apparatus 10 according to an embodiment of the present disclosure, since the uplink signal ULS is transmitted to the touch pen 20 through horizontal driving or horizontally partitioned driving of the plurality of horizontal touch groups HTG1 to HTG8, attenuation of the uplink signal ULS based on the user's hand or palm that touches the display panel 100 may be minimized. Accordingly, a position of the touch pen 20 positioned on the display panel 100 may be sensed even when the user's hand or palm is in contact with the display panel 100, and a touch drawing may be seamlessly sensed by sensing a pen touch, while tracking a position of the touch pen 20.

Figure 2:
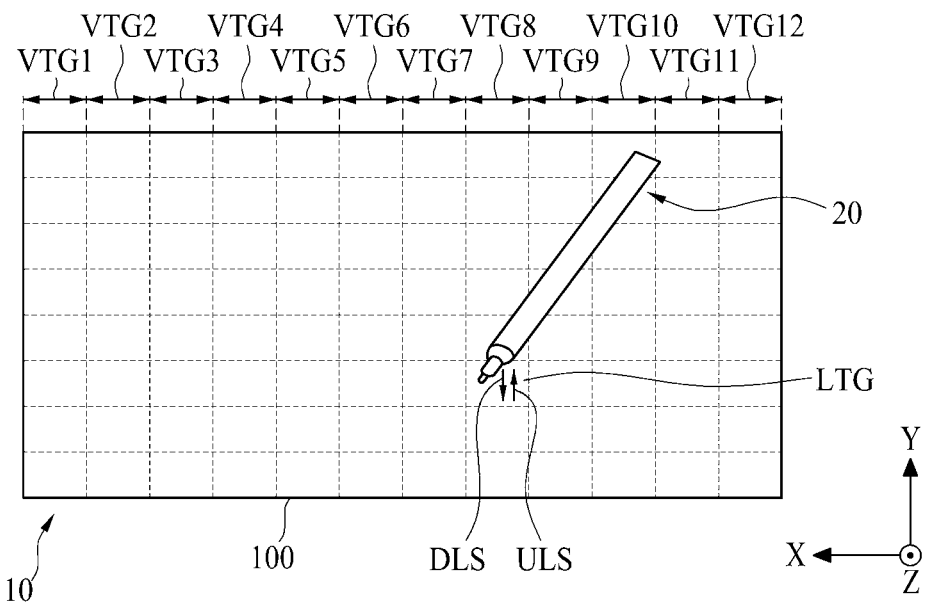
FIG. 2 is a view schematically illustrating pen sensing of a display apparatus according to another embodiment of the present disclosure.

FIG. 2 is a diagram schematically illustrating pen sensing of a display apparatus according to another embodiment of the present disclosure.

Referring to FIG. 2, in the display apparatus 10 according to another embodiment of the present disclosure, the display panel 100 is divided into a plurality of vertical touch groups VTG1 to VTG12, an uplink signal ULS is transmitted to the touch pen 20 through sequential driving or vertically partitioned driving of the plurality of vertical touch groups, a downlink signal DLS synchronized with the uplink signal through the vertical touch groups VTG1 to VTG12 which have transmitted the uplink signal ULS is transmitted from the touch pen 20 to sense a position of the touch pen 20, an uplink signal ULS is transmitted through a local touch group LTG where the touch pen 20 is positioned, and a downlink signal DLS transmitted from the touch pen 20 is received. In this manner, the pen touch is sensed according to the pen tracking scheme. Here, a DC voltage (or a common voltage) is applied to a vertical touch group which has not transmitted the uplink signal ULS, among the plurality of vertical touch groups VTG1 to VTG12.

According to the pen tracking scheme based on the position of the touch pen 20, the vertical touch group VTG7 where the touch pen 20 is positioned may be set as a local touch group LTG, or the vertical tough group VTG7 where the touch pen 20 is positioned and the adjacent vertical groups VTG6 and VTG8 may be set as a local touch group LTG, and the pen touch may be sensed, while tracking the set local touch group LTG.

In the display apparatus 10 according to another embodiment of the present disclosure, by transmitting the uplink signal ULS to the touch pen 20 through sequential driving or vertically partitioned driving of the plurality of vertical touch groups VTG1 to VTG12, attenuation of the uplink signal ULS based on the user's hand or palm that touches the display panel 100 may be minimized. Accordingly, the position of the touch pen 20 positioned on the display panel 100 may be sensed even when the user's hand or palm touches the display panel 100, and a touch drawing may be seamlessly sensed by sensing a pen touch, while tracking the position of the touch pen 20. The display apparatus 10 according to another embodiment of the present disclosure may reduce power consumption by transmitting and receiving a signal to and from the touch pen 20 through the local touch group LTG where the touch pen 20 is positioned.

Figure 3:
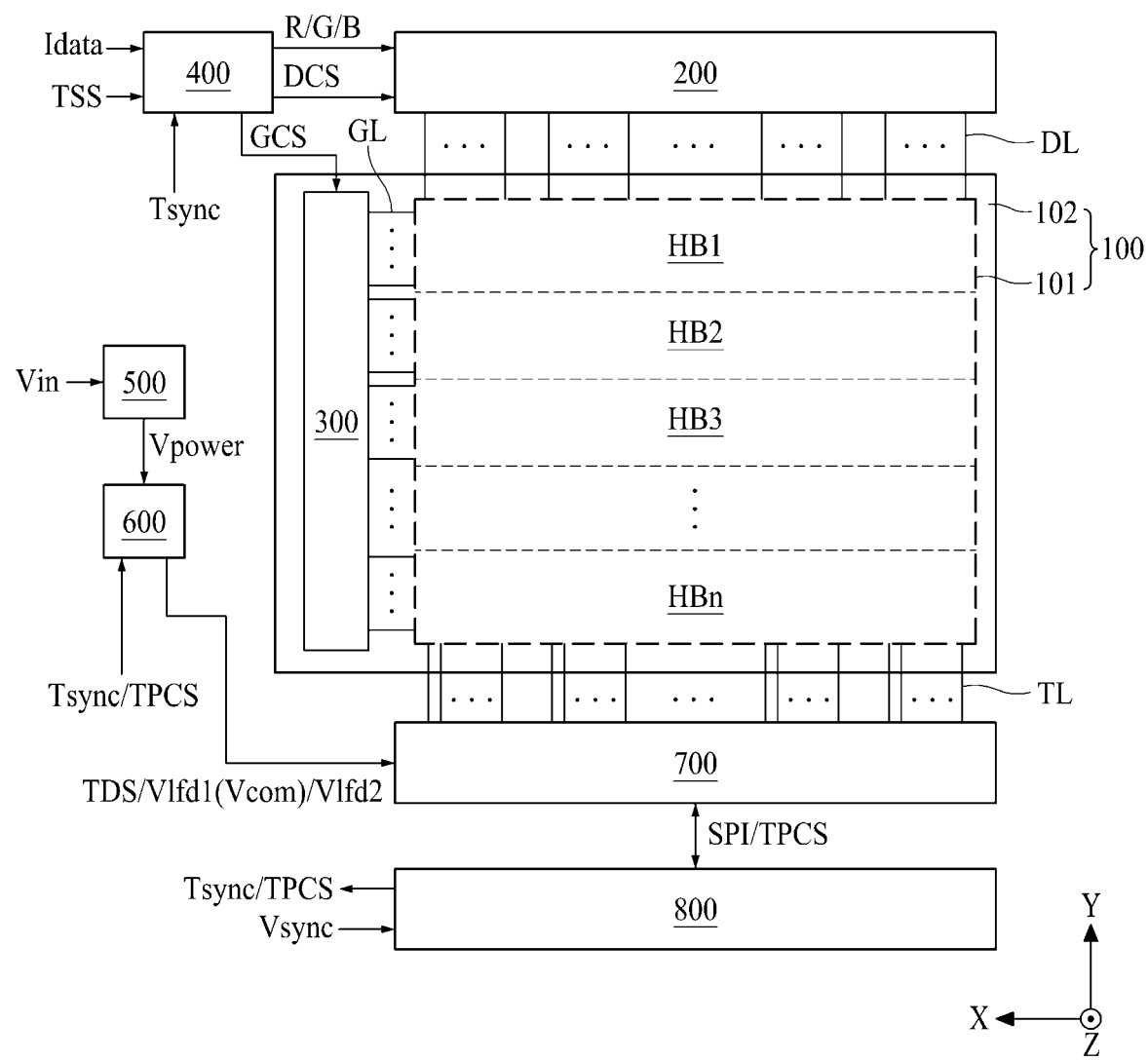
FIG. 3 is a view for explaining a display apparatus according to an embodiment of the present disclosure.
Figure 4:
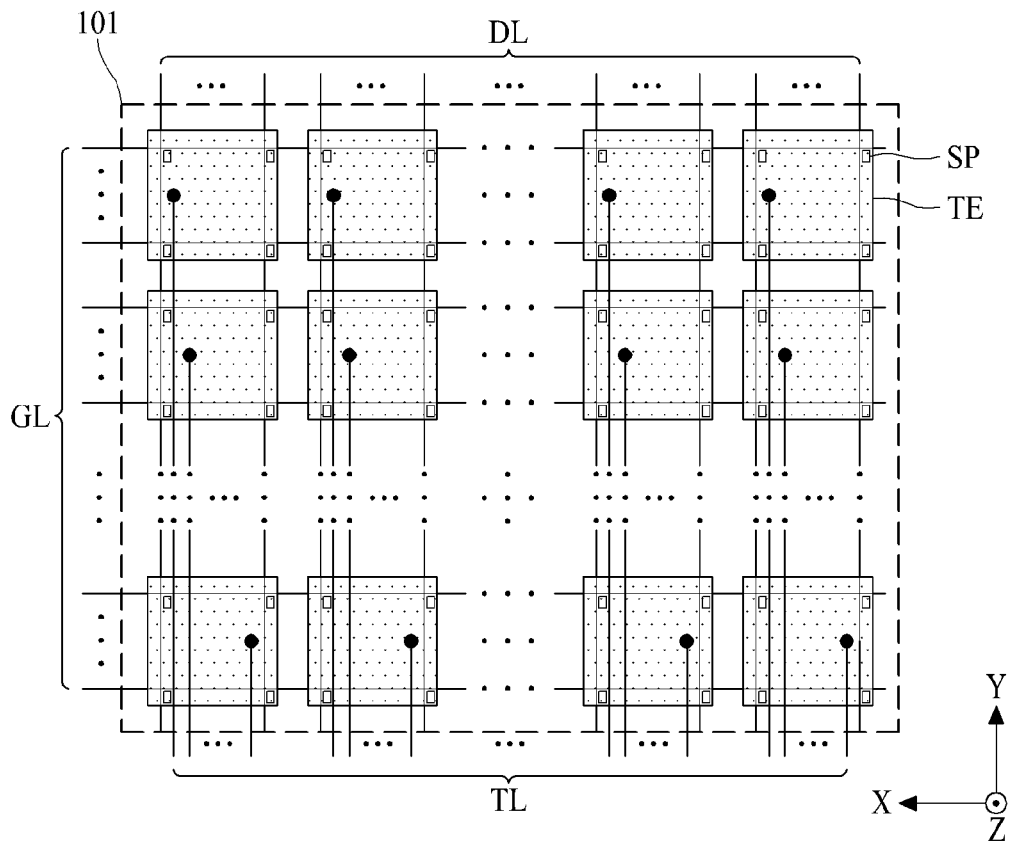
FIG. 4 is a view for explaining a display area illustrated in FIG. 3.
Figure 5:
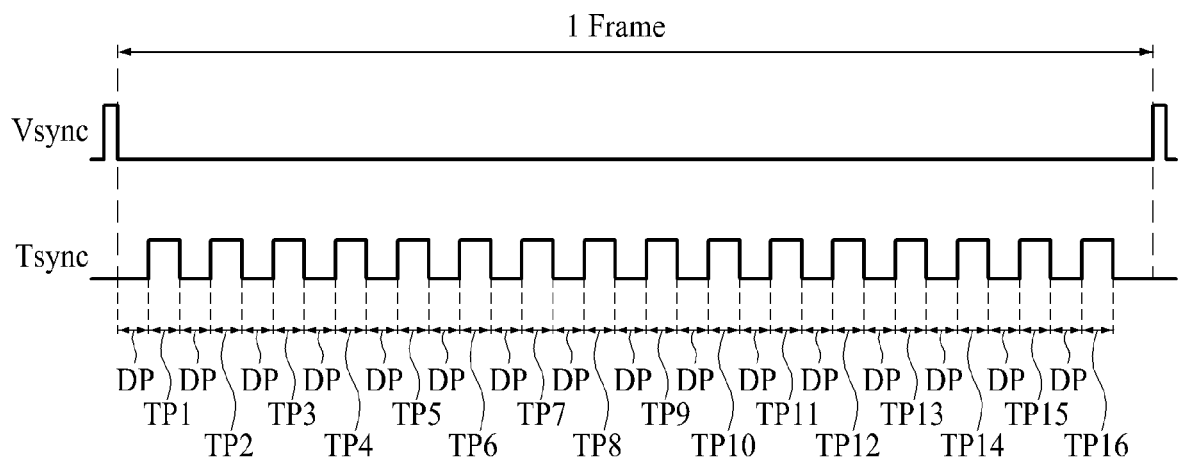
FIG. 5 is a waveform view illustrating a touch synchronization signal illustrated in FIG. 3.

FIG. 3 is a view for explaining a display apparatus according to an embodiment of the present disclosure, FIG. 4 is a view for explaining a display area illustrated in FIG. 3, and FIG. 5 is a waveform view of a touch synchronization signal illustrated in FIG. 3.

Referring to FIGS. 3 to 5, a display apparatus according to an embodiment of the present disclosure may include a display panel 100, a display driving circuit unit, a touch driving circuit 700, and a host controller 800.

The display panel 100 may be a liquid crystal display panel having an in-cell touch type structure using a capacitive scheme (or type). The display panel 100 according to an embodiment may have an in-cell touch type structure using a self-capacitive scheme (or type). The display panel 100 may operate in a display mode and a touch sensing mode. For example, the display panel 100 may display an image using light emitted from a backlight unit in the display mode and serves as a touch panel for sensing a touch in the touch sensing mode. The display mode may be performed for each of a plurality of display periods set in one frame, and the touch sensing mode may be performed for each of a plurality of touch sensing periods set between the plurality of display periods in one frame. Here, each of the plurality of touch sensing periods may be set immediately before each of the plurality of display periods.

The display panel 100 according to an embodiment includes a display area 101 provided on a substrate and a non-display area 102 provided at the edges of the substrate and surrounding the display area 101.

The display area 101 includes a plurality of data lines DL, a plurality of gate lines GL, a plurality of subpixels SP, a plurality of touch electrodes TE, and a plurality of touch routing lines TL.

Each of the plurality of data lines DL receives a data signal in the display mode. Each of the plurality of gate lines GL receives a scan pulse in the display mode. Each of the plurality of data lines DL and each of the plurality of gate lines GL is provided to intersect each other on the substrate to define a plurality of subpixel regions.

Each of the plurality of subpixels SP may include a thin film transistor (TFT) connected to the gate line GL and the data line DL adjacent thereto, a pixel electrode connected to the TFT, and a storage capacitor connected to the pixel electrode.

The TFT may include a gate terminal, a semiconductor layer, a first terminal, and a second terminal. The first terminal and the second terminal of the TFT may be defined as a source terminal or a drain terminal according to current directions. The TFT may have a bottom gate structure in which the gate terminal is located below the semiconductor layer and/or a top gate structure in which the gate terminal is located on the semiconductor layer. The TFT is covered by a passivation layer (or a planarization layer).

The pixel electrode may be formed of a transparent conductive material on the passivation layer in the subpixel region and may be connected to the second terminal of the TFT through via hole provided in the passivation layer.

The storage capacitor may be formed between the second terminal of the TFT and the touch electrode TE or between the pixel electrode and the touch electrode TE. The storage capacitor charges a data signal supplied through the TFT and maintains an electric field formed between the pixel electrode and the touch electrode TE using a charged voltage when the TFT is turned off.

Each of the plurality of touch electrodes TE serves as a touch sensor for sensing a touch applied by a touch object or as a common electrode for driving a liquid crystal by forming an electric field together with the pixel electrode. That is, each of the plurality of touch electrodes TE is used as a touch sensor in the touch sensing mode and as a common electrode in the display mode. Since each of the plurality of touch electrodes TE is also used as a common electrode for liquid crystal driving, it may include a transparent conductive material. The touch object may be defined as a user finger or a touch pen such as an active stylus pen.

Since each of the plurality of touch electrodes TE is used as a touch sensor of a self-capacitive scheme in the touch sensing mode, it must have a size larger than a minimum contact size between the touch object and the display panel 100. Accordingly, each of the plurality of touch electrodes TE may have a size corresponding to one or more subpixels SP. The plurality of touch electrodes TE according to an embodiment may be arranged at regular intervals along a plurality of horizontal lines and a plurality of vertical lines. For example, one horizontal line may include 84 touch electrodes TE arranged at regular intervals, and one vertical line may include 48 touch electrodes TE arranged at regular intervals.

The plurality of touch routing lines TL are respectively connected to the plurality of touch electrodes TE. In the display mode, each of the plurality of touch routing lines TL supplies a common voltage Vcom to the corresponding touch electrode TE, and, in the touch sensing mode, each of the plurality of touch routing lines supplies a touch driving pulse to the corresponding touch electrode TE and subsequently provides a variation in capacitance of the corresponding touch electrode TE to the touch driving circuit 700.

The display area 101 is divided into n (n is a natural number of 1 or greater) horizontal blocks HB1 to HBn and an image is displayed or touch sensing is performed in units of horizontal blocks according to time division driving. In an embodiment, each of the n horizontal blocks HB1 to HBn may include m (m is a natural number) gate lines GL (or horizontal lines) and the m gate lines GL may overlap one touch electrode TE. For example, the first horizontal block HB1 may include first to m-th gate lines and the second horizontal block HB2 may include (m+1)-th to 2m-th gate line.

The display driving unit time-divides the display area 101 of the display panel 100 into n horizontal blocks HB1 to HBn and supplies a data signal to the subpixels SP in units of the horizontal blocks at every display period DP of a touch synchronization signal Tsync. The display driving circuit unit according to an embodiment may include a data driving circuit 200, a gate driving circuit 300, a timing control circuit 400, a driving power supply unit 500, and a touch driving signal supply unit 600.

In the display mode, the data driving circuit 200 converts pixel data R/G/B into an analog data signal based on a data control signal DCS and supplies the converted analog data signal to the plurality of data lines DL.

The data driving circuit 200 according to an embodiment supplies a data signal to the sub-pixels SP of the corresponding horizontal block through the plurality of data lines DL at every display period DP of the touch synchronization signal Tsync.

The data driving circuit 200 according to another embodiment supplies a data signal to the subpixels SP of the corresponding horizontal block through the plurality of data lines DL at every display period DP of the touch synchronization signal Tsync. The data driving circuit 200 supplies a data load free signal to each of the plurality of data lines Dl overlapping the touch electrode TE to which a touch driving signal or an uplink signal is applied at every touch sensing period TP of the touch synchronization signal Tsync. Here, the data load free signal has the same phase as that of the touch driving signal or the uplink signal applied to the touch electrode TE in the touch sensing mode, whereby a load of the touch electrodes TE according to parasitic capacitance between the touch electrode TE and the data line Dl is reduced to enhance touch sensitivity.

The gate driving circuit 300 is embedded (or integrated) in a non-display area at one side of the display panel 100 together with a TFT manufacturing process of preparing a TFT in the subpixel SP and connected to the plurality of gate lines GL in a one-to-one manner. The gate driving circuit 300 generates a scan pulse on the basis of a gate control signal GCS in determined order and supplies the generated scan pulse to the gate line GL corresponding to determined order. The scan pulse supplied to the gate line is synchronized with a data signal supplied to the data line.

The gate driving circuit 300 according to an embodiment sequentially supplies scan pulses to i gate lines included in a horizontal block group in units of horizontal blocks at each display period DP of the touch synchronization signal Tsync. For example, the gate driving circuit 300 may include n driving stage groups having i driving stages sequentially supplying a scan pulse to i gate lines and n−1 holding stage groups arranged between the n driving stage groups, holding an output signal from a preceding driving stage group for a touch sensing period (TP) of the touch synchronization signal Tsync, and subsequently supplying the output signal as a start signal of a subsequent driving stage group.

The gate driving circuit 300 according to another embodiment sequentially supplies the scan pulse to i gate lines included in the horizontal block group in units of horizontal blocks at every display period DP of the touch synchronization signal Tsync. Also, the gate driving circuit 300 applies the gate load free signal to each of the plurality of gate lines GL overlapping the touch electrode TE to which the touch driving signal or the uplink signal is applied at every touch sensing period TP of the touch synchronization signal Tsync. Here, the gate load free signal has the same phase as that of the touch driving signal or the uplink signal applied to the touch electrode TE in the touch sensing mode to reduce a load of the touch electrodes TE according to parasitic capacitance between the touch electrode TE and the gate line GL to enhance touch sensitivity.

The timing control circuit 400 receives timing synchronization signal TSS such as a data enable signal, a reference clock signal, a vertical synchronization signal Vsync, and a horizontal synchronization signal supplied from a display driving system (or a host system) and provides the received vertical synchronization signal Vsync to the host controller 800. The timing control circuit 400 receives the touch synchronization signal Tsync from the host controller 800 and drives one frame of the display panel 100 to a plurality of display periods DP and a plurality of touch sensing periods TP in a time division manner on the basis of the touch synchronization signal Tsync.

The timing control circuit 400 receives input data Idata provided from the display driving system and aligns the input data Idata as pixel data R/G/B to fit to driving of the display panel 100 at each of the plurality of display periods DP and provides the aligned pixel data R/G/B to the data driving circuit 200.

The timing control circuit 400 generates and outputs a data control signal DCS and a gate control signal GCS on the basis of the timing synchronization signal TSS and the touch synchronization signal Tsync. Here, the data control signal DCS may include a source start signal, a source shift signal, a source enable signal, a polarity control signal, and the like. The gate control signal GCS may include at least one gate start signal, a plurality of gate shift clocks, and the like.

The driving power supply unit 500 generates driving power required for driving the display apparatus using input power Vin from the outside. In particular, the driving power supply 500 may generate a driving voltage Vpower including a logic driving voltage, a reference common voltage, a load free low voltage, and a load free high voltage and supplies the generated driving voltage Vpower to the touch driving circuit 700. The driving power supply unit 500 may be a power management integrated circuit mounted on a data printed circuit board, a control board, or a power supply board of the display apparatus.

The touch driving signal supply unit 600 generates a touch electrode driving signal TDS having a plurality of driving pulses swung between a high voltage and a low voltage with respect to a reference common voltage according to a touch pulse control signal TPCS based on the driving voltage Vpower provided from the driving power supply unit 500 and provides the generated touch electrode driving signal TD to the touch driving circuit 700. Here, the touch electrode driving signal TDS is modulated in pulse widths of each of the high voltage and the low voltage according to the touch pulse control signal TPCS so as to be used as an uplink signal, e.g., a touch driving signal, a pen driving signal, or a pen setting signal, supplied to the touch electrode TE during a touch sensing period. Also, the touch driving signal supply unit 600 provides the load free low voltage Vlfd1 and the load free high voltage Vlfd2 provided from the driving power supply unit 500 to the touch driving circuit 700. The load free low voltage Vlfd1 may be used as a common voltage Vcom provided to the touch electrode TE or a DC voltage supplied to the touch electrode TE to which the uplink signal is not supplied, during the display period DP. The touch driving signal supply unit 600 may be touch power integrated circuit mounted on a data printed circuit board, a control board, or a power supply board of the display apparatus.

The touch driving circuit 700 is connected to the plurality of touch electrodes TE in a one-to-one manner through the plurality of touch routing lines TL provided in the display panel 100. In response to channel control and sensing timing control of the host controller 800, the touch driving circuit 700 supplies the common voltage Vcom to each of the plurality of touch electrodes TE through each of the plurality of touch routing lines TL during the display period DP of the touch synchronization signal Tsync and senses a touch applied by a touch object through some or all of the plurality of touch electrodes TE during the touch sensing period TP of the touch synchronization signal Tsync.

In the touch sensing mode according to the touch sensing period TP of the touch synchronization signal Tsync, the touch driving circuit 700 according to an embodiment may sense a pen touch at each of a pen operation sensing period among the plurality of touch sensing periods TP set in one frame and sense a finger touch at every finger touch sensing period among the plurality of touch sensing periods TP. For example, in case where one frame includes first to sixteenth touch sensing periods TP1 to TP16, the first touch sensing period TP1 may be set as a pen setting period, each of the second to fourth, sixth to eighth, tenth to twelfth, fourteenth, and fifteenth touch sensing periods TP2 to TP4, TP6 to TP8, TP10 to TP12, TP14, and TP15 may be set as a pen sensing period, and each of the fifth, ninth, thirteenth, and sixteenth touch sensing periods TP5, TP9, TP13, and TP16 may be set as a finger sensing period. Also, each of the second, sixth, tenth, and fourteenth touch sensing periods TP2, TP6, TP10, and TP14 may be set as a pen position sensing period, and each of the third, fourth, seventh, eighth, eleventh, twelfth, and fifteenth touch sensing periods TP3, TP4, TP7, TP8, TP11, TP12, and TP15 may be set as a pen operation sensing period. Each of the second to sixteenth touch sensing periods TP2 to TP16 may include a first period for driving the touch electrode TE and a second period for sensing a variation in capacitance of the touch electrode.

The touch driving circuit 700 according to an embodiment divides the plurality of touch electrodes TE into a plurality of touch groups, supplies a touch driving signal to each of the touch electrodes of some or all of the plurality of touch groups, senses a change in capacitance of the corresponding touch electrode TE through each of the plurality of touch routing lines TL to generate finger touch raw data, and subsequently provide the generated finger touch raw data to the host controller 800.

The touch driving circuit 700 according to an embodiment divides the plurality of touch electrodes TE into a plurality of touch groups, supplies an uplink signal (i.e., a pen driving signal) to some of the plurality of touch groups at every first period of each of the plurality of pen position sensing periods TP2, TP6, TP10, and TP14, converts a downlink signal (i.e., a pen position data signal) transmitted from a touch pen through the touch group to which the pen driving signal has been supplied at every second period of each of the plurality of pen position sensing periods into first pen raw data and provides the converted first pen touch raw data to the host controller 800. At the same time, the touch driving circuit 700 supplies the DC voltage (or the common voltage Vcom) to the remaining touch groups other than the some of the plurality of touch groups at every first period of each of the plurality of pen position sensing periods, whereby a voltage of a storage capacitor provided in each of subpixels overlapping the touch electrodes TE of the remaining touch groups other than the some of the plurality of touch groups is maintained, without being changed according to an uplink signal supplied to the touch electrodes TE during the pen operation sensing period.

The touch driving circuit 700 according to an embodiment supplies a pen driving signal to a pen overlapping touch group corresponding to pen tracking channel information provided from the host controller 800, among the plurality of touch groups at every first period of each of the plurality of pen operation sensing periods, and converts a pen operation data signal transmitted from the touch pen through the pen overlapping touch group into second pen touch raw data and provides the converted second pen touch raw data to the host controller 800. At the same time, the touch driving circuit 700 according to an embodiment supplies the DC voltage (or the common voltage Vcom) to the remaining pen non-overlapping touch group other than the pen overlapping touch group among the plurality of touch groups at every first period of each of the plurality of pen operation sensing periods, whereby a voltage of the storage capacitor provided in each of the subpixels overlapping the touch electrodes TE of the pen non-overlapping touch groups is maintained, without being changed according to the uplink signal supplied to the touch electrodes TE during the pen operation sensing period.

The touch driving circuit 700 according to an embodiment may sense a position of the touch pen by sequentially supplying the uplink signal (i.e., the pen driving signal) to the plurality of touch groups at every first period of the plurality of touch position sensing periods. Here, each of the plurality of touch groups includes a touch electrode arranged on at least one horizontal line or at least one vertical line.

A touch driving circuit 700 according to another embodiment divides the plurality of touch electrodes TE into a first touch group and a second touch group and alternately supplies the uplink signal (i.e., the pen driving signal) to the first touch group and the second touch group in units of frames or in units of the first period of each of the plurality of touch sensing periods to sense a position of the touch pen. For example, the first touch group may include touch electrodes arranged on the odd-numbered horizontal lines among a plurality of horizontal lines and the second touch group may include touch electrodes arranged in even-numbered horizontal lines among the plurality of horizontal lines. In another embodiment, the first touch group may include touch electrodes arranged in the odd-numbered vertical lines among a plurality of vertical lines and the second touch group may include touch electrodes arranged in the even-numbered vertical lines among the plurality of vertical lines.

The host controller 800 may be a micro-controller unit (MCU) or an application processor.

The host controller 800 generates a touch synchronization signal Tsync and a touch pulse control signal TPCS for driving the display panel 100 in units of horizontal blocks in a time division manner on the basis of the vertical synchronization signal Vsync provided from the timing control circuit 400.

The touch synchronization signal Tsync according to an embodiment may include two or more display periods DP and two or more touch sensing periods TP during one frame according to the vertical synchronization signal Vsync of the timing synchronization signal TSS. The touch synchronization signal Tsync may be generated such that the touch sensing period TP starts before the display period DP. Here, the display period DP of the touch synchronization signal Tsync may be defined as a display mode of the display panel 100 and the touch sensing period TP of the touch synchronization signal Tsync may be defined as a touch sensing mode.

The touch pulse control signal TPCS may be defined as a signal for controlling an output period of the uplink signal, i.e., each of a touch driving signal for sensing a finger touch, a pen setting signal for sensing a pen touch, and a pen driving signal, supplied from the touch driving circuit 700 to the touch electrode TE. For example, the touch pulse control signal TPCS may be a pulse width modulation signal.

The host controller 800 according to an embodiment is connected to the touch driving circuit 700 through a serial peripheral interface (SPI). The host controller 800 generates touch control data including channel setting information, sensing block information, sampling start signal, digital conversion setting parameter, and the like, and provides the touch control data to the touch driving circuit 700 through the SPI scheme, thereby controlling a driving timing of the touch driving circuit 700. In particular, the host controller 800 divides the plurality of touch electrodes into a plurality of touch groups, generates channel group setting information for sequential driving by the touch group or partitioned driving by the touch group, and provides the channel group setting information to the touch driving circuit 700, thus minimizing attenuation of the uplink signal transmitted to the touch pen due to the user's hand or palm that touches the display panel 100, whereby the touch driving circuit 700 may sense a pen touch even when the user's hand or palm touches the display panel 100.

The host controller 800 according to an embodiment may receive the touch raw data provided from the touch driving circuit 700 through the SPI scheme, executes a predetermined touch sensing algorithm for the received finger touch raw data to calculate touch coordinate information, and execute an application corresponding to the calculated touch coordinate information.

The host controller 800 according to an embodiment receives the first pen touch raw data provided from the touch driving circuit 700 through the SPI scheme, calculates pen position information by executing a predetermined pen touch sensing algorithm on the received first pen touch raw data, generates channel setting information including the pen tracking channel information for a touch group corresponding to the calculated pen position information among the plurality of touch groups, and provides the generated channel setting information to the touch driving circuit 700. Accordingly, the touch driving circuit 700 supplies the uplink signals to the pen overlapping touch group corresponding to the pen tracking channel information at every first period of the plurality of pen operation sensing periods, converts a downlink signal transmitted from the touch pen through the pen overlapping touch group into second pen touch raw data and provides the converted second pen touch raw data to the host controller at every second period of the plurality of pen operation sensing periods. Here, the pen overlapping touch group may be a horizontal touch group having touch electrodes arranged on at least one horizontal line according to an arrangement structure of the plurality of touch groups or a local touch group in a vertical touch group having touch electrodes arranged on at least one vertical line. The host controller 800 may receive the second pen touch raw data provided from the touch driving circuit 700 through the SPI scheme, calculate pen operation information by executing a pen operation sensing algorithm previously set for the received second pen touch raw data, and execute an application corresponding to the calculated pen position information and pen operation information. Here, the pen operation information may be pen pressure information, button operation information, or the like.

Selectively, the host controller 800 may be embedded in the timing control circuit 400 or the touch driving circuit 700. In this case, the present disclosure is advantageous in that the number of components of the display apparatus and the connection structure between the components may be simplified. The touch synchronization signal Tsync and the touch pulse control signal TPCS may be generated in the timing control circuit 400, rather than in the host controller 800.

Figure 6:
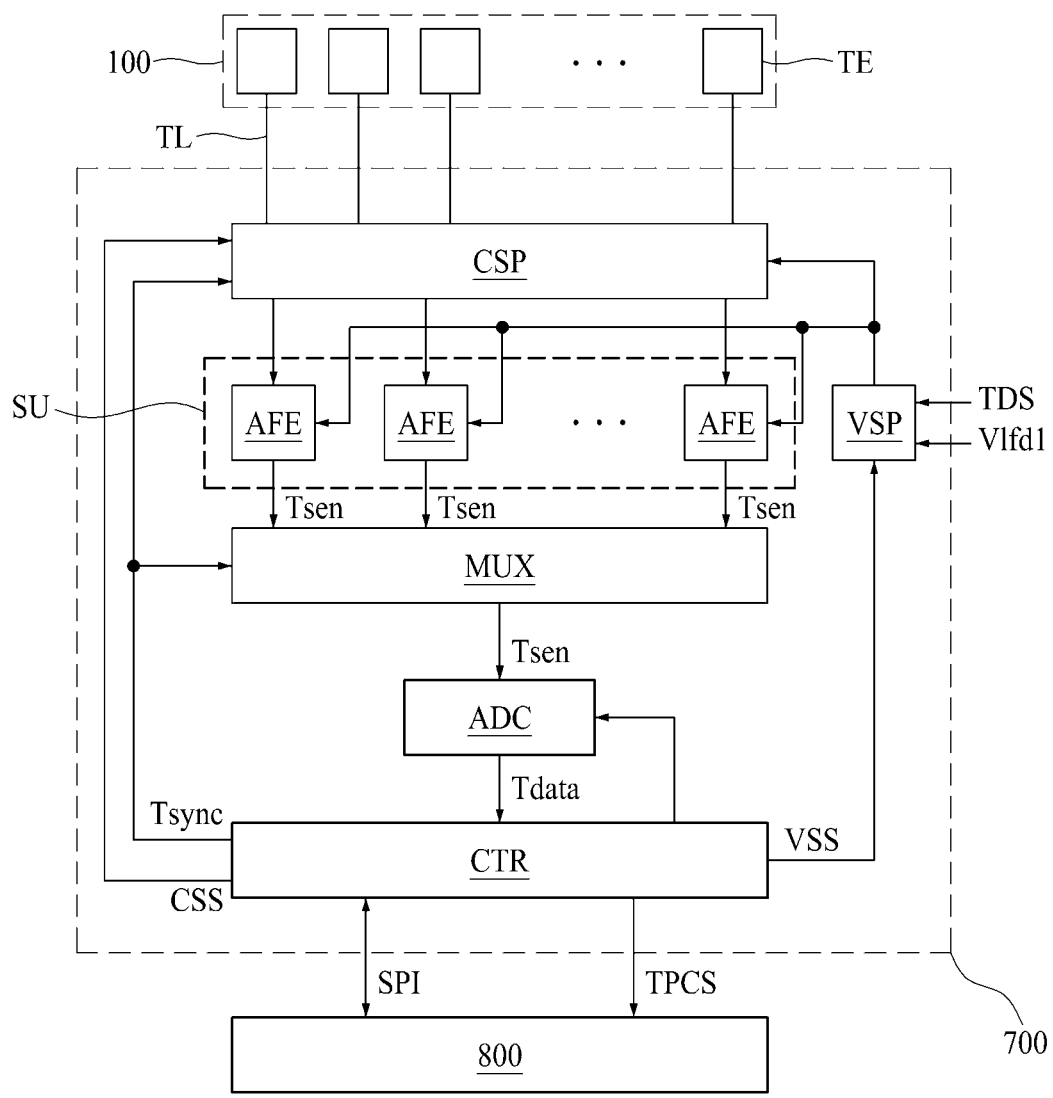
FIG. 6 is a view for explaining a touch driving circuit according to an embodiment of the present disclosure.

FIG. 6 is a view for explaining a touch driving circuit according to an embodiment of the present disclosure.

Referring to FIG. 6, a touch driving circuit 700 according to an embodiment of the present disclosure may include a channel selecting unit CSP, a voltage selecting unit VSP, a sensing unit SU, a multiplexer MUX, an analog-to-digital converter ADC, and a touch control circuit CTR.

The channel selecting unit CSP is connected to the plurality of touch electrodes TE in a one-to-one manner through a plurality of touch routing lines TL. The channel selecting unit CSP selectively supplies the uplink signal and the load free low voltage Vlfd1 to a touch group corresponding to the channel selection signal CSS at every first period of the plurality of pen sensing periods. The channel selecting unit CSP selects a touch group corresponding to the channel selection signal at every second period of the plurality of pen sensing periods. That is, the channel selecting unit CSP connects a touch routing line TL corresponding to the channel selection signal CSS to the corresponding sensing circuit AFE. The channel selecting unit CSS according to an embodiment may include a plurality of multiplexers switched according to the touch synchronization signal Tsync and the channel selection signal CSS.

The voltage selecting unit VSP selectively supplies the touch electrode driving signal TDS (or the uplink signal) and the load free low voltage Vlfd1 supplied from the touch driving signal supply unit 600 to the channel selecting unit CSP according to a voltage selection signal VSS supplied from the touch control circuit CTR. For example, the voltage selecting unit VSP supplies the load free low voltage Vlfd1 used as a common voltage at every display period of the touch synchronization signal Tsync to the channel selecting unit CSP. Also, the voltage selecting unit VSP selectively supplies the touch electrode driving signal TDS and the load free low voltage Vlfd1 to the channel selecting unit CSP so that the uplink signal according to the touch electrode driving signal TDS may be supplied to the touch electrodes of some of the plurality of touch groups and the DC voltage according to the load free low voltage Vlfd1 may be supplied to the remaining touch groups other than the some of the plurality of touch groups.

The sensing unit SU is selectively connected to the plurality of touch electrodes TE provided in the display panel 100 through the channel selecting unit CSP, supplies an uplink signal including a touch driving signal, a pen setting signal, or a pen driving signal, and senses a downlink signal including a pen position data signal or a pen data signal transmitted from the touch pen. The sensing unit SU according to an embodiment may include a plurality of sensing circuits AFE.

Each of the plurality of sensing circuits AFE senses a variation in capacitance of the touch electrode TE input through the touch routing line TL and the channel selecting unit CSP and outputs a touch sensing signal Tsen. Each of the plurality of sensing circuits AFE senses a variation in capacitance of the touch electrode TE using the touch electrode driving signal TDS or the load free low voltage Vlfd1 output from the voltage selecting unit VSP as a reference signal and outputs a touch sensing signal Tsen. For example, the plurality of sensing circuits AFE output the touch sensing signal Tsen by sensing a variation in capacitance according to the pen position data signal through touch electrodes of some of the plurality of touch groups within the pen position sensing period among the plurality of touch sensing periods TP, output the touch sensing signal Tsen by sensing a variation in capacitance according to the pen operation data signal through touch electrodes of some of the plurality of touch groups within the pen operation sensing period among the plurality of touch sensing periods TP, and output the touch sensing signal Tsen by sensing a variation in capacitance according to the finger touch through touch electrodes of some of the plurality of touch groups within the finger sensing period among the plurality of touch sensing periods TP.

Selectively, each of the plurality of sensing circuits AFE may sense a variation in capacitance of the touch electrode TE using the touch electrode driving signal TDS or the load free high voltage Vlfd2 output from the voltage selecting unit VSP, as a reference signal, and output the touch sensing signal Tsen.

The multiplexer MUX selectively connects the plurality of sensing circuits AFE to the ADC one by one by the plurality of touch sensing periods TP according to the touch synchronization signal Tsync supplied from the touch control circuit CTR.

The analog-to-digital converter (ADC) performs analog-to-digital conversion on the touch sensing signal Tsen supplied from any one of the plurality of sensing circuits AFE under the control of the touch control circuit CTR to generate touch raw data Tdata.

The touch control circuit CTR generates the touch synchronization signal Tsync and provides the generated touch synchronization signal Tsync to the display driving circuit, while providing the same to a multiplexer MUX. In addition, the touch control circuit CTR generates the channel selection signal CSS corresponding to sequential driving on a touch group basis or divided driving on a touch group basis based on the touch control data provided from the host controller 800 and provides the channel selection signal CSS to the channel selecting unit CSP. The touch control circuit CTR supplies the uplink signal to the corresponding touch electrode during the first period of the plurality of touch sensing periods TP and simultaneously supplies the common voltage (or DC voltage) to the corresponding touch electrode, and generates the voltage selection signal VSS for supplying the common voltage (or DC voltage) to the corresponding touch electrode during the second period of the plurality of touch sensing periods TP and provides the generated voltage selection signal VSS to the voltage selecting unit VSP. Also, the touch control circuit CTR temporarily stores the touch raw data from the ADC in the memory and provides the stored touch raw data to the host controller 800 through the SPI scheme.

Selectively, in the touch driving circuit 700 according to the present embodiment, the voltage selecting unit VSP may be mounted on a printed circuit board (PCB) on which the timing control circuit and the host controller 800 are mounted and supply the touch electrode driving signal TDS and the load free low voltage Vlfd1 to the channel selecting unit CSP of the touch driving circuit 700 according to the voltage selection signal VSS. That is, the voltage selecting unit VSP may not be embedded in the touch driving circuit 700 but may be arranged outside the touch driving circuit 700. In this case, in the present disclosure, the touch driving circuit 700 including the voltage selecting unit VSP may not be separately manufactured and may advantageously be used in a general-purpose (or common) touch driving circuit that does not include the voltage selecting unit VSP.

Figure 7:
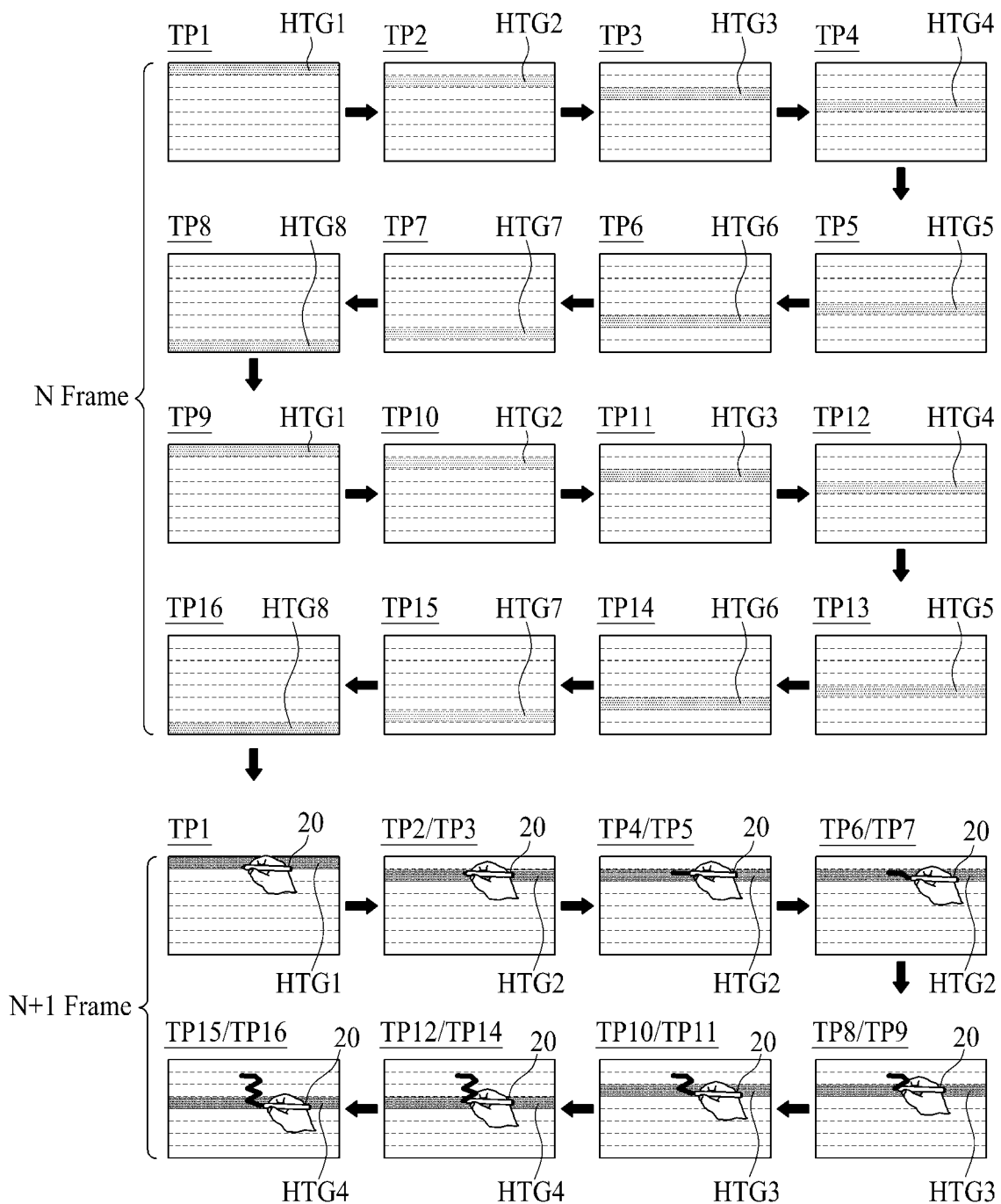
FIG. 7 is a view illustrating sensing of a pen touch according to an embodiment of the present disclosure.
Figure 8:
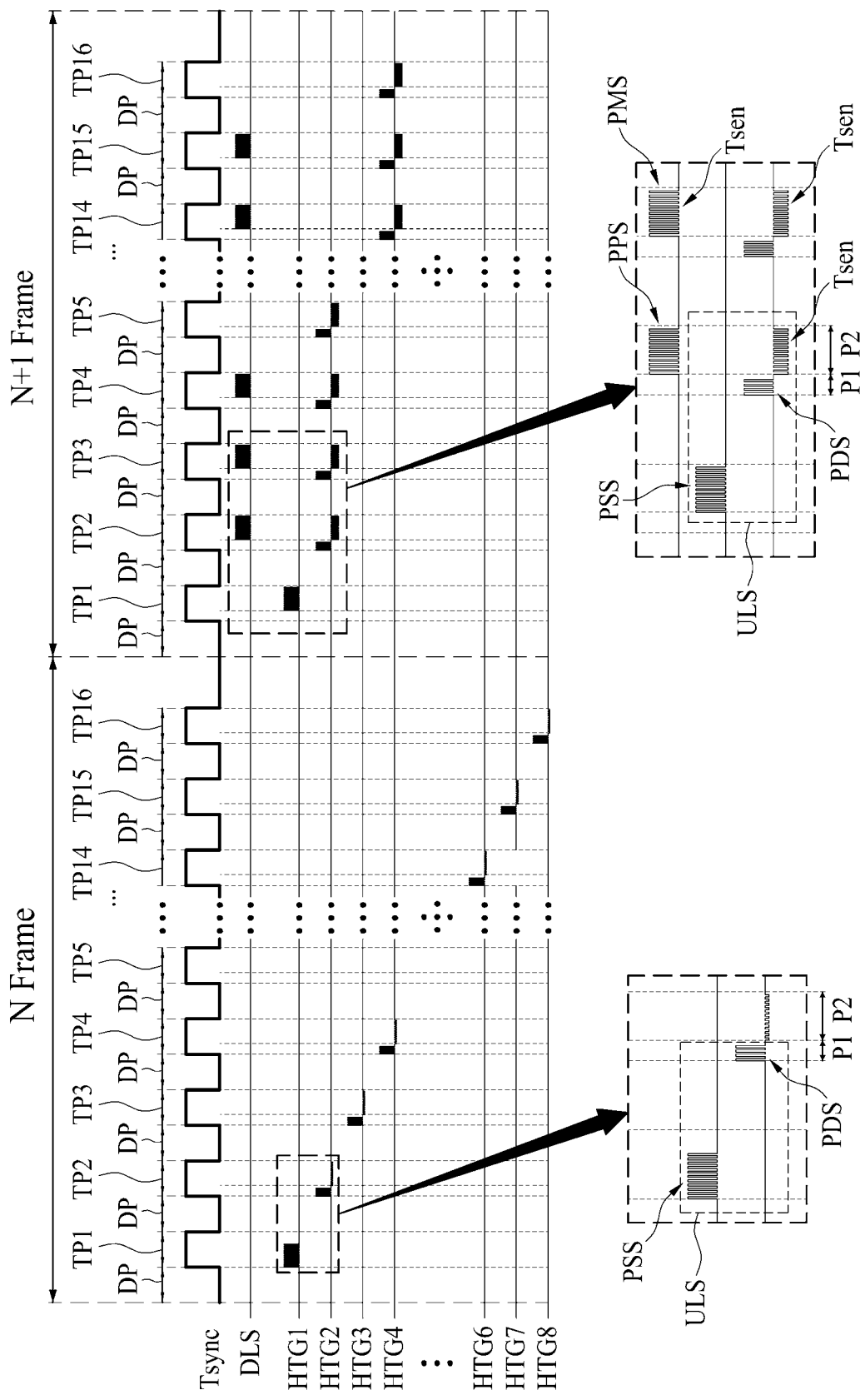
FIG. 8 is a waveform view for explaining an operation timing of a display apparatus according to the pen touch illustrated in FIG. 7.

FIG. 7 is a view illustrating sensing of a pen touch according to an embodiment of the present disclosure, and FIG. 8 is a waveform view for explaining an operation timing of a display apparatus according to a pen touch illustrated in FIG. 7.

A pen position sensing method of a display apparatus according to an embodiment of the present disclosure will be described with reference to FIGS. 7 and 8 together with FIG. 6.

First, the touch driving circuit 700 divides the plurality of touch electrodes provided in the display panel 100 into first to eighth horizontal touch groups HTG 1 to HTG 8, and sequentially supplies the uplink signals ULS to the first to eighth horizontal touch groups HTG1 to HTG8 to sense a pen touch. Here, the touch driving circuit 700 supplies the common voltage or the DC voltage to the touch electrodes of the remaining horizontal touch groups other than the horizontal touch group transmitting the uplink signal ULS to the touch pen.

Specifically, during the first touch sensing period TP1 of the Nth frame, the touch driving circuit 700 applies the uplink signals ULS, i.e., the pen setting signal PSS, to the touch electrodes of the first horizontal touch group HTG1 of the display panel 100. Here, the pen setting signal PSS may be defined as a signal for informing the touch pen 20 of a pen frequency, a pen driving scheme (contact or hovering), a panel driving state (basic driving, low power driving), and the like. Subsequently, the touch driving circuit 700 sequentially supplies the uplink signal ULS, i.e., the pen driving signal PDS, again to the touch electrodes of the first to eighth horizontal touch groups HTG1 to HTG8 at every first period P1 of each of the ninth to sixteenth sensing periods TP9 to TP16 of the Nth frame, and sequentially senses a pen touch through a variation in capacitance of the touch electrodes of the corresponding horizontal touch group at every second period P2 of each of the ninth to sixteenth touch sensing periods TP9 to TP16. After sequentially supplying the touch driving signal of the touch electrodes of the corresponding horizontal touch group at every first period P1 of each of the fifth, ninth, thirteenth, and sixteenth touch sensing periods TP5, TP9, TP13, and TP16 of the Nth frame, the touch driving circuit 700 may sequentially sense a user's finger touch through a variation in capacitance of the touch electrodes of the corresponding horizontal touch group at every second period P2 of each of the fifth, ninth, thirteenth, and sixteenth touch sensing periods TP5, TP9, TP13 and TP16.

Thereafter, the touch driving circuit 700 supplies the uplink signal, i.e., the pen setting signal PSS, to the touch electrodes of the first horizontal touch group HTG1 of the display panel 100 during the first touch sensing period TP1 of the (N+1)th frame. Accordingly, the touch pen 20 positioned on the display panel 100 receives the pen setting signal PSS transmitted from the touch electrodes of the first horizontal touch group HTG1 of the display panel 100 and sets a pen driving frequency and a pen driving scheme (contact or hovering) according to the pen setting signal PSS.

Subsequently, the touch driving circuit 700 supplies the uplink signal ULS, i.e., the pen driving signal PDS, to the touch electrodes of the second horizontal touch group HTG2 during the first period P1 of the second touch sensing period TP2 of the (N+1)th frame. Accordingly, the touch pen 20 receives the pen driving signal PDS transmitted from the touch electrodes of the second horizontal touch group HTG2 of the display panel 100 and transmits the downlink signal DLS, i.e., the pen position signal PPS, synchronized with the received pen driving signal PDS to the touch electrodes of the second horizontal touch group HTG2 of the display panel 100 via the conductive tip. At the same time, the touch driving circuit 700 senses a variation in capacitance of the touch electrodes of the second horizontal touch group HTG2 during the second period P2 of the second touch sensing period TP2 through the sensing unit SU and provides the touch sensing signal Tsen to the touch control circuit CTR, and the touch control circuit CTR generates the first pen touch raw data based on the touch sensing signal Tsen and provides the first pen touch raw data to the host controller 800. The host controller 800 calculates the pen position information based on the first pen touch raw data, generates channel setting information including pen tracking channel information corresponding to the horizontal touch group HTG corresponding to the calculated pen position information, while executing an application corresponding to the calculated pen position information, and provides the generated channel setting information to the touch driving circuit 700.

Thereafter, the touch driving circuit 700 supplies the uplink signal ULS, i.e., the pen driving signal PDS, to the touch electrodes of the second horizontal touch group HTG2 during the first period P1 of the third touch sensing period TP3 of the (N+1)th frame according to the pen tracking channel information provided from the host controller 800. Accordingly, the touch pen 20 receives the pen driving signal PDS transmitted from the touch electrodes of the second horizontal touch group HTG2 of the display panel 100 and transmits the downlink signal DLS, i.e., the pen modulation data signal PMS, synchronized with the received pen driving signal PDS to the touch electrodes of the second horizontal touch group HTG2 of the display panel 100 through the conductive tip. At the same time, the touch driving circuit 700 senses a variation in capacitance of the touch electrodes of the second horizontal touch group HTG2 during the second period P2 of the third touch sensing period TP3 through the sensing unit SU and provides the touch sensing signal Tsen to the touch control circuit CTR, and the touch control circuit CTR generates the second pen touch raw data on the basis of the touch sensing signal Tsen and provides the second pen touch raw data to the host controller 800. The host controller 800 calculates the pen operation information based on the basis of the second pen touch raw data, generates the pen operation information formed of the pen tracking channel information according to the position of the touch pen 20, while executing the application corresponding to the calculated pen operation information, and provides the same to the touch driving circuit 700.

Thereafter, the touch driving circuit 700 supplies the uplink signal ULS, i.e., the pen driving signal PDS, to the touch electrodes of the corresponding horizontal touch group at every first period P1 of the fourth to sixteenth touch sensing periods TP4 to TP16 of the (N+1)th frame. Accordingly, the touch pen 20 receives the pen driving signal PDS transmitted from the touch electrodes of the corresponding horizontal touch group of the display panel 100 and transmits the downlink signal synchronized with the received pen driving signal PDS to the touch electrodes of the corresponding horizontal touch group of the display panel 100 through the conductive tip. At the same time, the touch driving circuit 700 senses a variation in capacitance of the touch electrodes of the corresponding horizontal touch group at every second period P2 of the corresponding touch sensing periods TP4 to TP16 through the sensing unit SU and provides the touch sensing signal Tsen to the touch control circuit CTR, and the touch control circuit CTR provides the touch sensing signal Tsen to the touch control circuit CTR, generates the pen touch raw data on the basis of the touch sensing signal Tsen and, provides the generated pen touch raw data to the host controller 800. The host controller 800 calculates pen position information or pen operation information on the basis of the pen touch raw data, generates tracking setting information including tracking channel information, while executing an application corresponding to the calculated pen position information or pen operation information, and provides the channel setting information to the touch driving circuit 700. The touch driving circuit 700 may supply the touch driving signal of the touch electrodes of the corresponding horizontal touch group at every first period P1 of each of the fifth, ninth, thirteenth, and sixteenth touch sensing periods TP5, TP9, TP13, and TP16 of the (N+1)th frame and subsequently sense the user's finger touch through a variation in capacitance of the touch electrodes of the corresponding horizontal touch group at every second period P2 of each of the fifth, ninth, thirteenth, and sixteenth touch sensing periods TP5, TP9, TP13, and TP16.

In this manner, in the display apparatus according to an embodiment of the present disclosure, since the pen touch is sensed by supplying the uplink signal ULS sequentially to the first to eighth horizontal touch groups HTG1 to HTG8 defined in the display panel 100, even when the user's hand or palm touches the display panel 100, a position of the touch pen 20 positioned on the display panel 100 may be sensed and a touch drawing may be seamlessly sensed by sensing a pen touch, while tracking the position of the touch pen 20.

Figure 9:
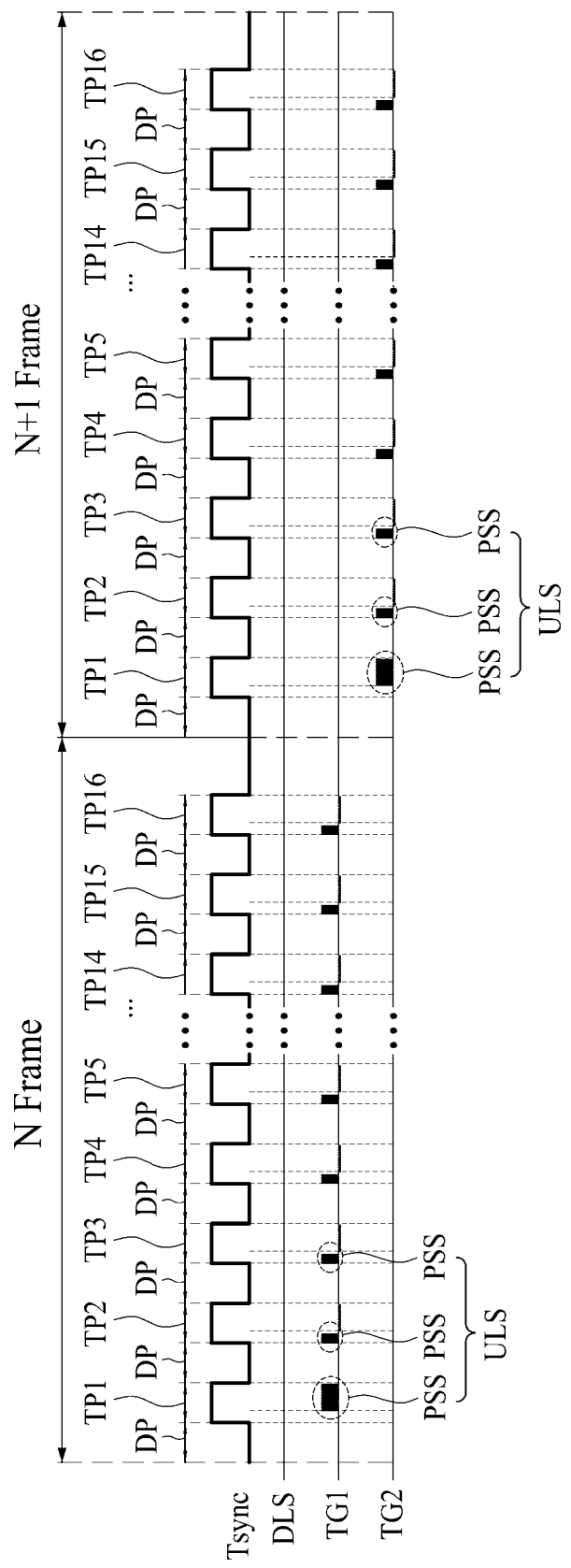
FIGS. 9 and 10 are waveform views for explaining an operation timing of the apparatus according to another embodiment of the present disclosure.

FIG. 9 is a waveform view for explaining an operation timing of a display apparatus according to another embodiment of the present disclosure, which shows only an operation for sensing a position of a touch pen 20 positioned on a display panel.

A pen position sensing method of a display apparatus according to another embodiment of the present disclosure will be described with reference to FIG. 9 together with FIG. 6.

First, the touch driving circuit 700 may divide the plurality of touch electrodes provided on the display panel 100 into a first touch group TG1 and a second touch group TG2, and alternately supply the uplink signal ULS, i.e., the pen driving signal, to the first touch group TG1 and the second touch group TG2. The first touch group TG1 according to an embodiment may include touch electrodes arranged on the odd-numbered horizontal lines among the plurality of horizontal lines, and the second touch group TG2 may include touch electrodes arranged on the even-numbered horizontal lines among the plurality of horizontal lines.

Specifically, during the first touch sensing period TP1 of the Nth frame, the touch driving circuit 700 supplies the uplink signal ULS, i.e., the pen setting signal PSS, to the touch electrodes of the first touch group TG1 and supplies a common voltage (or a DC voltage) to the touch electrodes of the second touch group TG2. Subsequently, the touch driving circuit 700 supplies the uplink signal ULS, i.e., the pen driving signal PDS (or the pen synchronization signal), again to the touch electrodes of the first touch group TG1 and simultaneously supplies the common voltage (or the DC voltage) to the touch electrodes of the second touch group TG2 at every first period P1 of each of the second to sixteenth touch sensing periods TP2 to TP16 of the Nth frame and senses a pen touch through a variation in capacitance of the touch electrodes of the first touch group at every second period P2 of each of the second to sixteenth touch sensing periods TP2 to TP16. After supplying the touch driving signal of the touch electrodes of the corresponding horizontal touch group at every first period P1 of each of the fifth, ninth, thirteenth, and sixteenth touch sensing periods TP5, TP9, TP13, and TP16 of the Nth frame, the touch driving circuit 700 may sense a user's finger touch through a variation in capacitance of the touch electrodes of the corresponding horizontal touch group at every second period P2 of each of the fifth, ninth, thirteenth, and sixteenth touch sensing periods TP5, TP9, TP13, and TP16.

Thereafter, during the first touch sensing period TP1 of the (N+1)th frame, the touch driving circuit 700 supplies the uplink signal ULS, i.e., the pen setting signal PSS, to the touch electrodes of the second touch group TG2 and supplies the common voltage (or the DC voltage) to the touch electrodes of the first touch group TG1. Subsequently, the touch driving circuit 700 supplies the uplink signal ULS, i.e., the pen driving signal PDS (or the pen synchronization signal), to the touch electrodes of the second touch group TG2 and simultaneously supplies the common voltage (or the DC voltage) to the touch electrodes of the first touch group TG1 at every first period P1 of each of the second to sixteenth touch sensing periods TP2 to TP16 of the (N+1)th frame and senses a pen touch through a variation in capacitance of the touch electrodes of the second touch group at every second period P2 of each of the second to sixteenth touch sensing periods TP2 to TP16. After supplying the touch driving signal of the touch electrodes of the corresponding horizontal touch group at every first period P1 of each of the fifth, ninth, thirteenth, and sixteenth touch sensing periods TP5, TP9, TP13, and TP16 of the Nth frame, the touch driving circuit 700 may sense a user's finger touch through a variation in capacitance of the touch electrodes of the corresponding horizontal touch group at every second period P2 of each of the fifth, ninth, thirteenth, and sixteenth touch sensing periods TP5, TP9, TP13, and TP 16.

As described above, in the display apparatus according to another embodiment of the present disclosure, since a pen position is sensed by alternately supplying the uplink signal ULS to the first and second touch groups TG1 and TG2 defined in the display panel 100 in units of frames, position of the touch pen 20 positioned on the display panel 100 may be sensed even when the user's hand or palm touches the display panel 100 and a touch drawing may be seamlessly sensed by sensing the pen touch, while tracking a position of the touch pen 20 on the basis of the position of the touch pen 20.

Figure 10:
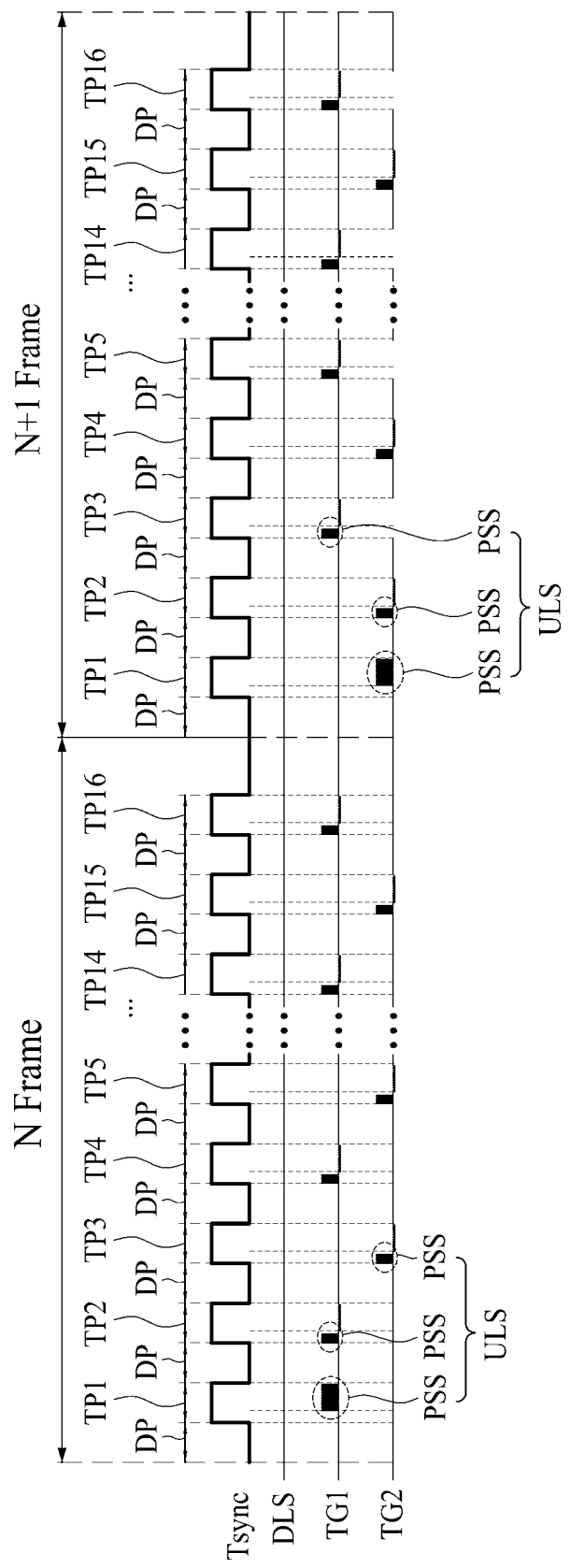

Selectively, as illustrated in FIG. 10, the touch driving circuit 700 of the display apparatus according to another embodiment of the present disclosure may supply the pen setting signal PSS to the touch electrodes of the first touch group TG1 or the second touch group TG2 during the first touch sensing period TP1 of each frame and subsequently alternately supply the uplink signal ULS to the first and second touch groups TG1 and TG2 in units of the touch sensing periods during the second to sixteenth sensing periods TP2 to TP16 to sense a pen position, and in this case, the position of the touch pen 20 may be more quickly sensed.

Figure 11:
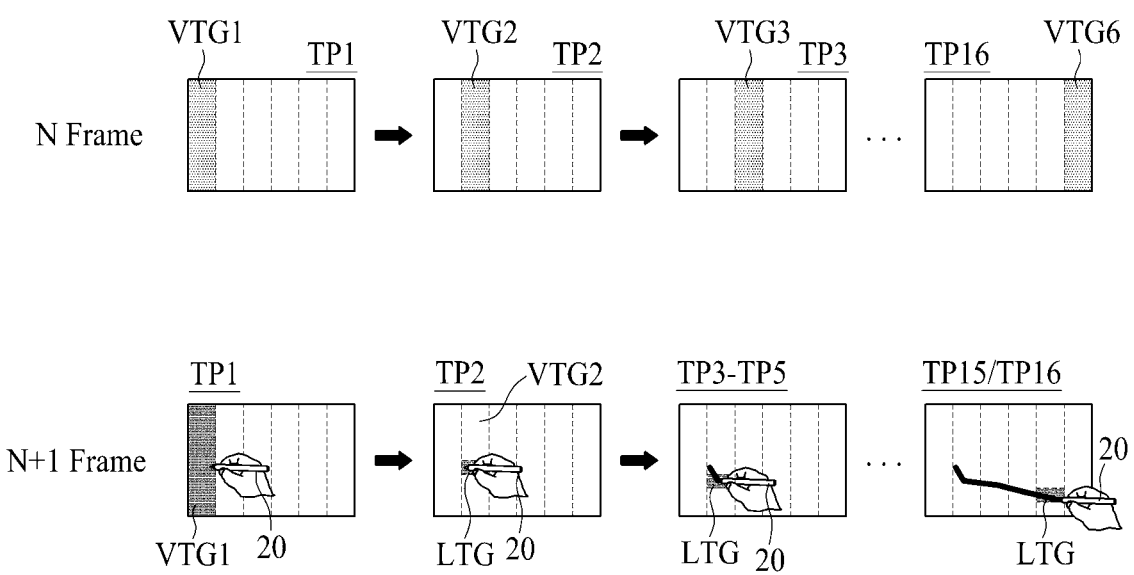
FIG. 11 is a view illustrating sensing of a pen touch according to another embodiment of the present disclosure.
Figure 12:
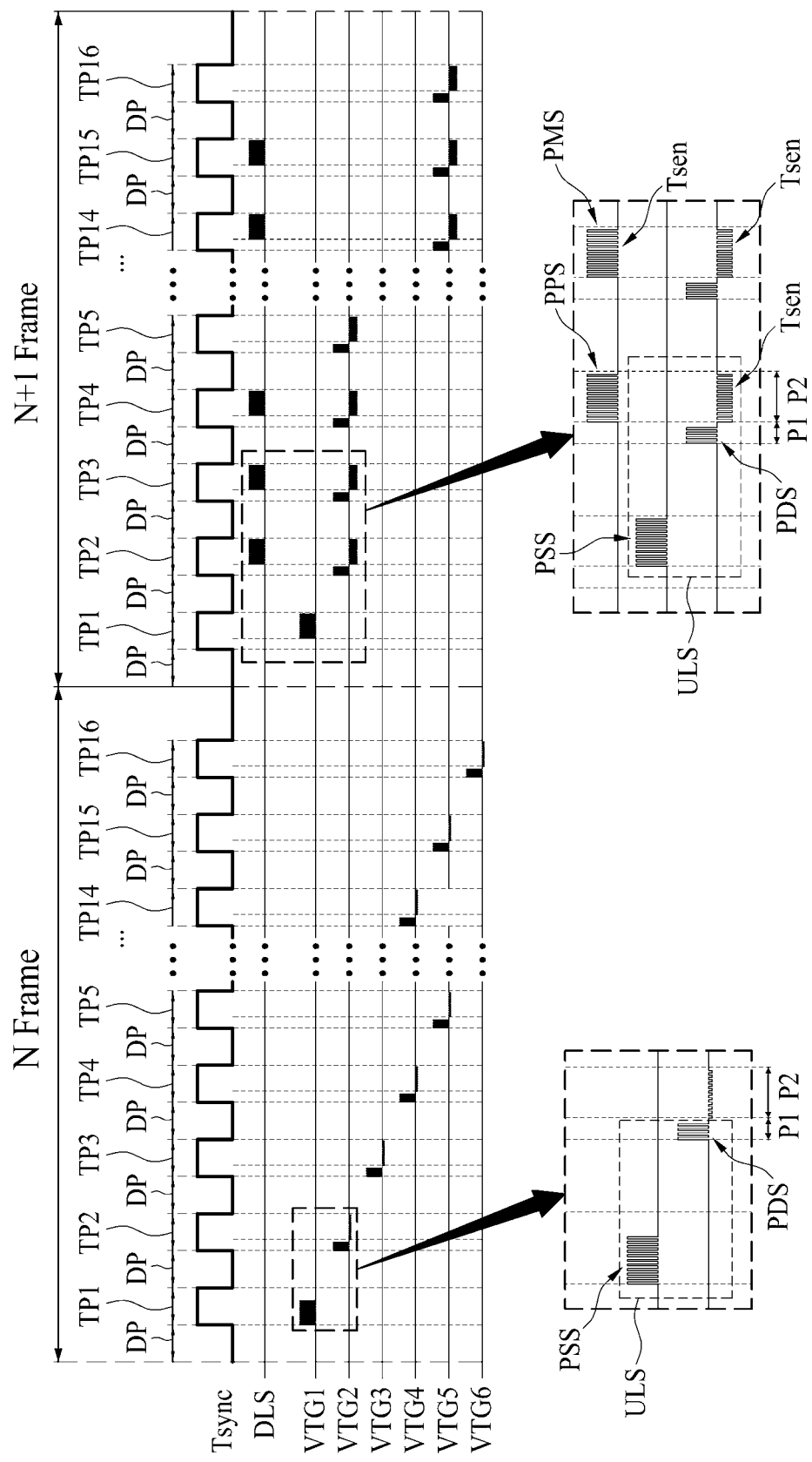
FIG. 12 is a waveform view for explaining an operation timing of a display apparatus according to the pen touch illustrated in FIG. 11.

FIG. 11 is a view illustrating sensing of a pen touch according to another embodiment of the present disclosure, and FIG. 12 is a waveform view for explaining an operation timing of a display apparatus according to the pen touch illustrated in FIG. 11.

A pen position sensing method of a display apparatus according to another embodiment of the present disclosure will be described with reference to FIGS. 11 and 12 together with FIG. 6.

First, the touch driving circuit 700 divides a plurality of touch electrodes provided in the display panel 100 into first to sixth vertical touch groups VTG1 to VTG6 and sequentially supplies an uplink signal ULS to the first to sixth vertical touch groups VTG1 to VTG6 to sense a pen touch. Here, the touch driving circuit 700 supplies a common voltage or a DC voltage to touch electrodes of a remaining vertical touch group other than the vertical touch group which transmits the uplink signal ULS to the touch pen.

Specifically, during the first touch sensing period TP1 of the Nth frame, the touch driving circuit 700 supplies the uplink signal ULS, i.e., the pen setting signal PSS, to the touch electrodes of the first vertical touch group VTG1 of the display panel 100. Subsequently, the touch driving circuit 700 sequentially supplies the uplink signal ULS, i.e., the pen driving signal PDS (or the pen synchronization signal), to the touch electrodes of the second to sixth vertical touch groups VTG2 to VTG6 at every first period P1 of each of the second to sixth touch sensing periods TP2 to TP6 of the Nth frame, and sequentially senses a pen touch through a variation in capacitance of the touch electrodes of the corresponding vertical touch group at every second period P2 of each of the second to sixth touch sensing periods TP2 to TP6. Thereafter, the touch driving circuit 700 sequentially supplies the uplink signal ULS, i.e., the pen driving signal PDS, again to the touch electrodes of the first to sixth vertical touch groups VTG1 to VTG6 at every first period P1 of each of the seventh to sixteenth touch sensing periods TP7 to TP16 of the Nth frame and sequentially senses a pen touch through a variation in capacitance of the touch electrodes of the corresponding vertical touch group at every second period P2 of each of the seventh to sixteenth touch sensing periods TP7 to TP16. After supplying the touch driving signal of the touch electrodes of the corresponding horizontal touch group at every first period P1 of each of the fifth, ninth, thirteenth, and sixteenth touch sensing period TP5, TP9, TP13, and TP16 of the Nth frame, the touch driving circuit 700 may sense a user's finger touch through a variation in capacitance of the touch electrodes of the corresponding horizontal touch group at every second period P2 of each of the fifth, ninth, thirteenth, and sixteenth touch sensing periods TP5, TP9, TP13, and TP16.

Thereafter, the touch driving circuit 700 supplies the uplink signal, i.e., the pen setting signal, to the touch electrodes of the first vertical touch group VTG1 of the display panel 100 during the first touch sensing period TP1 of the (N+1)th frame. Accordingly, the touch pen 20 positioned on the display panel 100 receives the pen setting signal PSS transmitted from the touch electrodes of the first vertical touch group VTG1 of the display panel 100 and set a pen driving frequency and pen driving scheme (contact or hovering) according to the pen setting signal PSS.

Subsequently, the touch driving circuit 700 supplies the uplink signal ULS, i.e., the pen driving signal PDS, to the touch electrodes of the second vertical touch group VTG2 during the first period P1 of the second touch sensing period TP2 of the (N+1)th frame. Accordingly, the touch pen 20 receives the pen driving signal PDS transmitted from the touch electrodes of the second vertical touch group VTG2 of the display panel 100 and transmits the downlink signal DLS, i.e., the pen position signal PPS, synchronized with the received pen driving signal PDS to the touch electrodes of the second vertical touch group VTG2 of the display panel 100 through the conductive tip. At the same time, the touch driving circuit 700 senses a variation in capacitance of the touch electrodes of the second vertical touch group VTG2 during the second period P2 of the second touch sensing period TP2 through the sensing unit SU and provides the touch sensing signal Tsen to the touch control circuit CTR, and the touch control circuit CTR provides the first pen touch raw data to the host controller 800 on the basis of the touch sensing signal Tsen. The host controller 800 calculates the pen position information on the basis of the first pen touch raw data, generates channel setting information including pen tracking channel information corresponding to the local touch group LTG corresponding to the calculated pen position information, while executing an application corresponding to the calculated pen position information, and provides the generated channel setting information to the touch driving circuit 700.

Subsequently, the touch driving circuit 700 supplies the uplink signal ULS, i.e., the pen driving signal PDS, to the touch electrodes of the local touch group LTG in the second vertical touch group VTG2 during the first period P1 of the third touch sensing period TP3 of the (N+1)th frame. Accordingly, the touch pen 20 may receive the pen driving signal PDS transmitted from the touch electrodes of the local touch group LTG of the display panel 100 and transmits the downlink signal DLS, i.e., the pen operation data signal PMS, synchronized with the received pen driving signal PDS to the touch electrodes of the local touch group LTG of the display panel 100 through the conductive tip. At the same time, the touch driving circuit 700 senses a variation in capacitance of the touch electrodes of the local touch group LTG during the second period P2 of the third touch sensing period TP3 through the sensing unit SU and provides the touch sensing signal Tsen to the touch control circuit CTR, and the touch control circuit CTR generates the second pen touch raw data on the basis of the touch sensing signal Tsen and provides the generated second pen touch raw data to the host controller 800. The host controller 800 calculates the pen operation information on the basis of the second pen touch raw data, generates channel setting information including the pen tracking channel information according to a position of the touch pen 20, while executing an application corresponding to the calculated pen operation information, and provides the generated channel setting information to the touch driving circuit 700.

Subsequently, the touch driving circuit 700 supplies the uplink signal ULS, i.e., the pen driving signal PDS, to the touch electrodes of the local touch group LTG of the corresponding vertical touch group at every first period P1 of the fourth to sixteenth touch sensing periods TP4 to TP16 of the (N+1)th frame. Accordingly, the touch pen 20 receives the pen driving signal PDS transmitted from the touch electrodes of the local touch group LTG in the corresponding vertical touch group of the display panel 100 and transmits the downlink signal synchronized with the received pen driving signal PDS to the touch electrodes of the local touch group LTG of the corresponding vertical touch group of the display panel 100 through the conductive tip. At the same time, the touch driving circuit 700 senses a variation in capacitance of the touch electrodes of the local touch group LTG in the corresponding vertical touch group at every second period P2 of the corresponding touch sensing periods TP4 to TP16 through the sensing unit SU and provides the touch sensing signal Tsen to the touch control circuit CTR, and the touch control circuit CTR provides the touch sensing signal Tsen to the touch control circuit CTR, generates the pen touch raw data on the basis of the touch sensing signal Tsen and, provides the generated pen touch raw data to the host controller 800. The host controller 800 calculates pen position information or pen operation information on the basis of the pen touch raw data, generates tracking setting information including tracking channel information, while executing an application corresponding to the calculated pen position information or pen operation information, and provides the channel setting information to the touch driving circuit 700. The touch driving circuit 700 may supply the touch driving signal of the touch electrodes of the local touch group LTG of the corresponding vertical touch group at every first period P1 of each of the fifth, ninth, thirteenth, and sixteenth touch sensing periods TP5, TP9, TP13, and TP16 of the (N+1)th frame and subsequently sense the user's finger touch through a variation in capacitance of the touch electrodes of the local touch group LTG in the corresponding vertical touch group at every second period P2 of each of the fifth, ninth, thirteenth, and sixteenth touch sensing periods TP5, TP9, TP13, and TP16.

In this manner, in the display apparatus according to another embodiment of the present disclosure, since the pen touch is sensed by supplying the uplink signal ULS sequentially to the first to sixth vertical touch groups VTG1 to VTG6 defined in the display panel 100, even when the user's hand or palm touches the display panel 100, a position of the touch pen 20 positioned on the display panel 100 may be sensed and a touch drawing may be seamlessly sensed by sensing a pen touch, while tracking the position of the touch pen 20. In addition, in the display apparatus according to another embodiment of the present disclosure, since the pen touch is sensed through only the local touch group LTG in the first to sixth vertical touch groups VTG1 to VTG6 in which the touch pen 20 is located, power consumption may be reduced. For example, according to a simulation result of the power consumption, it was confirmed that, when a pen touch was sensed through only one local touch group LTG in which the touch pen 20 is located, 83% of power consumption was reduced as compared with a comparative example in which a pen touch is sensed through the entire touch electrodes, and when a pen touch was sensed through two local tough groups including one local touch group LTG in which the touch pen 20 is located and another local touch group positioned adjacent thereto, 67% of power consumption was reduced as compared with the comparative example.

Figure 13:
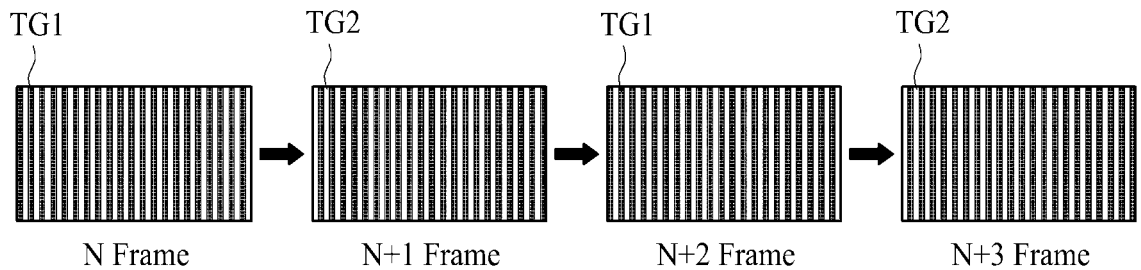
FIGS. 13 and 14 are views illustrating sensing of a pen touch according to another embodiment of the present disclosure.

FIG. 13 is a view illustrating sensing of a pen touch according to another embodiment of the present disclosure, which shows only an operation for sensing a position of a touch pen located on a display panel.

A pen position sensing method of a display apparatus according to another embodiment of the present disclosure will be described with reference to FIG. 13 together with FIGS. 6 and 9.

First, the touch driving circuit 700 may divide the plurality of touch electrodes provided on the display panel 100 into a first touch group TG1 and a second touch group TG2, and alternately supply the uplink signal ULS, i.e., the pen driving signal, to the first touch group TG1 and the second touch group TG2 in units of frames. The first touch group TG1 according to an embodiment may include touch electrodes arranged on the odd-numbered vertical lines among the plurality of vertical lines, and the second touch group TG2 may include touch electrodes arranged on the even-numbered vertical lines among the plurality of vertical lines.

Specifically, during the first touch sensing period TP1 of the Nth frame or the (N+2)th frame, the touch driving circuit 700 supplies the uplink signal ULS, i.e., the pen setting signal PSS, to the touch electrodes of the first touch group TG1 and supplies a common voltage (or a DC voltage) to the touch electrodes of the second touch group TG2. Subsequently, the touch driving circuit 700 supplies the uplink signal ULS, i.e., the pen driving signal PDS (or the pen synchronization signal), again to the touch electrodes of the first touch group TG1 and simultaneously supplies the common voltage (or the DC voltage) to the touch electrodes of the second touch group TG2 at every first period P1 of each of the second to sixteenth touch sensing periods TP2 to TP16 of the Nth frame or the (N+2)th frame and senses a pen touch through a variation in capacitance of the touch electrodes of the first touch group at every second period P2 of each of the second to sixteenth touch sensing periods TP2 to TP16. After supplying the touch driving signal of the touch electrodes of the corresponding vertical touch group at every first period P1 of each of the fifth, ninth, thirteenth, and sixteenth touch sensing periods TP5, TP9, TP13, and TP16 of the Nth frame or the (N+2)th frame, the touch driving circuit 700 may sense a user's finger touch through a variation in capacitance of the touch electrodes of the corresponding vertical touch group at every second period P2 of each of the fifth, ninth, thirteenth, and sixteenth touch sensing periods TP5, TP9, TP13, and TP16.

Thereafter, during the first touch sensing period TP1 of the (N+1)th frame or the (N+3)th frame, the touch driving circuit 700 supplies the uplink signal ULS, i.e., the pen setting signal PSS, to the touch electrodes of the second touch group TG2 and supplies the common voltage (or the DC voltage) to the touch electrodes of the first touch group TG1. Subsequently, the touch driving circuit 700 supplies the uplink signal ULS, i.e., the pen driving signal PDS (or the pen synchronization signal), to the touch electrodes of the second touch group TG2 and simultaneously supplies the common voltage (or the DC voltage) to the touch electrodes of the first touch group TG1 at every first period P1 of each of the second to sixteenth touch sensing periods TP2 to TP16 of the (N+1)th frame or the (N+3)th frame and senses a pen touch through a variation in capacitance of the touch electrodes of the second touch group at every second period P2 of each of the second to sixteenth touch sensing periods TP2 to TP16. After supplying the touch driving signal of the touch electrodes of the corresponding vertical touch group at every first period P1 of each of the fifth, ninth, thirteenth, and sixteenth touch sensing periods TP5, TP9, TP13, and TP16 of the (N+1)th frame or the (N+3)th frame me, the touch driving circuit 700 may sense a user's finger touch through a variation in capacitance of the touch electrodes of the corresponding vertical touch group at every second period P2 of each of the fifth, ninth, thirteenth, and sixteenth touch sensing periods TP5, TP9, TP13, and TP 16.

As described above, in the display apparatus according to another embodiment of the present disclosure, since a pen position is sensed by alternately supplying the uplink signal ULS to the first and second touch groups TG1 and TG2 defined in the display panel 100 in units of frames, position of the touch pen 20 positioned on the display panel 100 may be sensed even the user's hand or palm touches the display panel 100 and a touch drawing may be seamlessly sensed by sensing the pen touch, while tracking a position of the touch pen 20 on the basis of the position of the touch pen 20.

Figure 14:
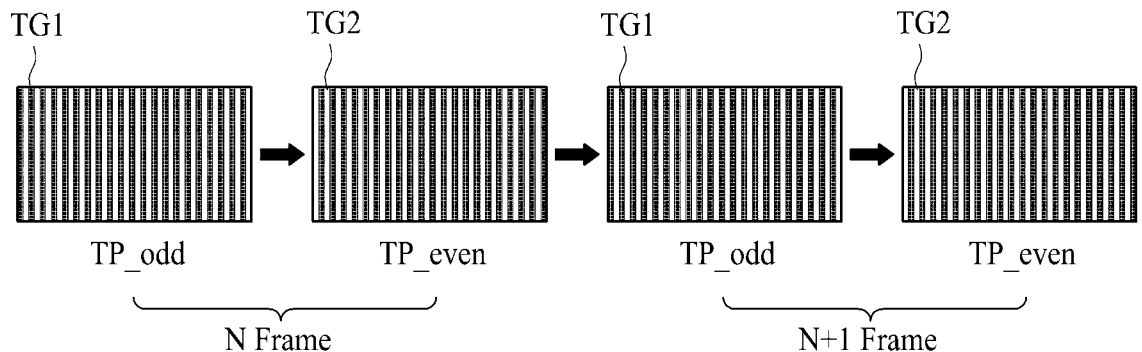

Selectively, as illustrated in FIG. 14, the touch driving circuit 700 of the display apparatus according to another embodiment of the present disclosure may supply the pen setting signal PSS to the touch electrodes of the first touch group TG1 or the second touch group TG2 during the first touch sensing period TP1 of each frame and subsequently alternately supply the uplink signal ULS to the first and second touch groups TG1 and TG2 in units of the touch sensing periods during the second to sixteenth sensing periods TP2 to TP16 to sense a pen position, and in this case, the position of the touch pen 20 may be more quickly sensed. For example, the touch driving circuit 700 may supply the uplink signal to the first touch group TG1 during the odd-numbered touch sensing period TP_odd of the first to sixteenth touch sensing periods TP1 to TP16 and supply the uplink signal to the second touch group TG2 during the even-numbered touch sensing period TP_even thereof. In another embodiment, in the odd-numbered frame, the touch driving circuit 700 may supply the uplink signal to the first touch group TG1 during the odd-numbered touch sensing period TP_odd of the first to sixteenth touch sensing periods TP1 to TP16 and supply the uplink signal to the second touch group TG2 during the even-numbered touch sensing period TP_even. In the even-numbered frame, the touch driving circuit 700 may supply the uplink signal to the second touch group TG2 during the odd-numbered touch sensing period TP_odd of the first to sixteenth touch sensing periods TP1 to TP16 and supply the uplink signal to the first touch group TG1 during the even-numbered touch sensing period TP_even.

Figure 15:
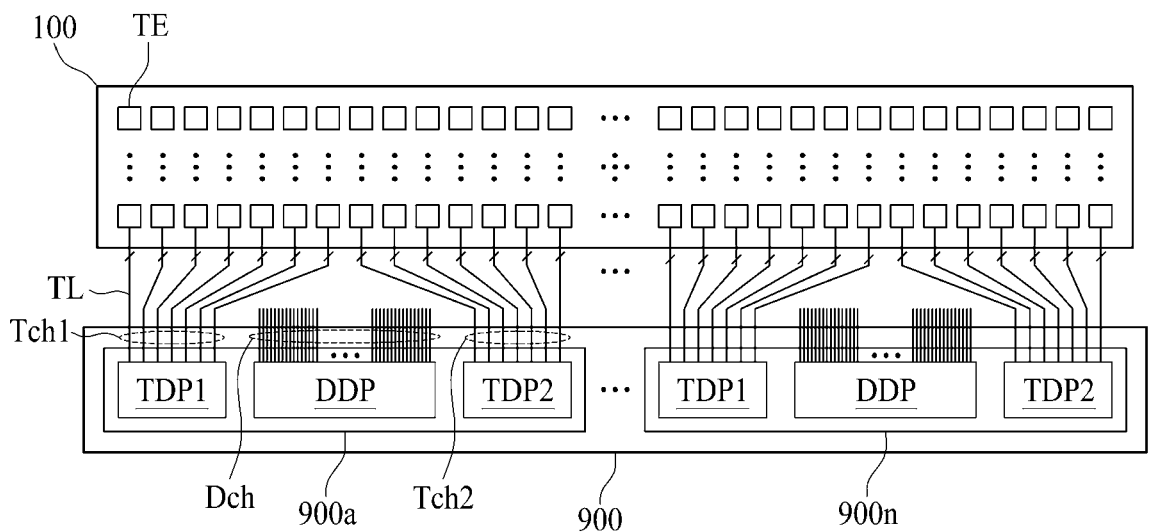
FIG. 15 is a view for explaining a display apparatus according to another embodiment of the present disclosure.

FIG. 15 is a view for explaining a display apparatus according to another embodiment of the present disclosure, which is constructed by modifying the data driving circuit and the touch driving circuit illustrated in FIG. 3. Accordingly, in the following description, only the data driving circuit, the touch driving circuit, and the related components will be described, and a redundant description of the same components will be omitted.

Referring to FIG. 15, in the display apparatus according to another embodiment of the present disclosure, the data driving circuit and the touch driving circuit may be configured as a data/touch driving unit 900.

The data/touch driving unit 900 is connected to a plurality of touch electrodes TE and a plurality of data lines, divides the plurality of touch electrodes TE into a plurality of touch groups, supplies the common voltage to the touch electrodes TE at each of a plurality of display periods, and senses a position of a touch pen through some of the plurality of touch electrodes TE at each of a plurality of pen sensing periods. That is, the data/touch driving unit 900 supplies the uplink signals to some of the plurality of touch groups and senses a downlink signal transmitted from the touch pen through the touch group to which the uplink signal was supplied, to generate pen touch raw data. Also, on the basis of the touch control data including channel setting information having pen tracking channel information provided from the host controller through the SPI scheme, the data/touch driving unit 900 supplies the uplink signal to a pen overlap touch group corresponding to the pen tracking channel information at each pen position sensing period, senses a downlink signal transmitted from the touch pen through the pen overlap touch group to generate a touch sensing signal, converts the generated touch sensing signal into pen touch row data, and provides the converted pen touch row data to the host controller.

The data/touch driving unit 900 according to an embodiment may include a plurality of integrated driving ICs 900a to 900n. Here, each of the plurality of integrated driving ICs 900a to 900n may also be expressed as a source readout integrated circuit (SRIC) or a readout integrated circuit (ROIC).

Each of the plurality of integrated driving ICs 900a to 900n may include a plurality of first touch channels Tch1, a plurality of second touch channels Tch2, a plurality of data channels Dch, a first touch driving nit TDP1, a second touch driving unit TDP2, and a data driving unit DDP.

The plurality of first touch channels Tch1 are connected to the touch electrodes TE arranged in i (i is a natural number of 2 or greater) vertical lines among a plurality of defined vertical lines of the display panel 100 in a one-to-one manner. In this example, it is assumed that the plurality of first touch channels Tch1 are connected with the touch electrodes TE arranged in seven vertical lines in a one-to-one manner. For example, the plurality of first touch channels Tch1 provided in the first integrated driving IC 900a may be connected to the touch electrodes TE provided in the first to seventh vertical lines in a one-to-one manner.

The plurality of second touch channels Tch2 are connected to touch electrodes arranged in i vertical lines adjacent to i vertical lines connected to the plurality of first touch channels Tch1 among the plurality of defined vertical lines of the display panel 100 in a one-to-one manner. In this example, it is assumed that a plurality of second touch channels Tch2 are connected with the touch electrodes TE arranged in seven vertical lines in a one-to-one manner. For example, the plurality of second touch channels Tch2 provided in the first integrated driving IC 900a may be connected to the touch electrodes TE provided in the eighth to fourteenth vertical lines in a one-to-one manner.

The plurality of data channels Dch are arranged between the plurality of first touch channels Tch1 and the plurality of second touch channels Tch2 and are connected to a plurality of data lines overlapping the touch electrodes TE arranged in 2i vertical lines in a one-to-one manner.

The first touch driving unit TDP1 is connected to the touch electrodes TE arranged on i vertical lines, among the plurality of touch electrodes TE provided on the display panel 100 in a one-to-one manner. That is, the first touch driving unit TDP1 may be connected to the touch electrodes TE arranged in the i vertical lines through the plurality of first touch channels Tch1 in a one-to-one manner.

The second touch driving unit TDP2 is connected to the touch electrodes TE arranged in i vertical lines adjacent to i vertical lines connected to the first touch driving unit TDP1 among the plurality of vertical lines. That is, the second touch driving unit TDP2 may be connected to the touch electrodes TE arranged in the i vertical lines through the plurality of second touch channels Tch2.

The data/touch driving unit has the same configuration as that of the touch driving circuit 700 illustrated in FIGS. 3 and 6, except that each of the first and second touch driving units TDP1 and TDP2 are connected to the touch electrodes TD arranged in the I vertical lines in a one-to-one manner, and thus, a description thereof will be omitted. Here, a voltage selecting unit configured in each of the first and second touch driving units TDP1 and TDP2 may be mounted outside the integrated driving ICs 900a to 900n, e.g., on a printed circuit board on which the timing control circuit and the host controller are mounted, and supply a touch electrode driving signal and a load free low voltage to the channel selecting unit of the corresponding touch driving unit according to the voltage selection signal.

The data driving unit DDP is connected to a plurality of data lines overlapping the touch electrodes arranged between the first touch driving unit TDP1 and the second touch driving unit TDP2 and arranged in 2i vertical lines in a one-to-one manner. That is, the data driving unit DDP may be connected to the plurality of data lines overlapping the touch electrodes TE arranged in 2i vertical lines through the plurality of data channels Dch in a one-to-one manner. For example, the data driving unit DDP may be connected with the plurality of data lines overlapping fourteen touch electrodes TE arranged on one horizontal line in a one-to-one manner. The data driving unit DDP is the same as the data driving circuit 200 illustrated in FIG. 3, except that it is connected with the plurality of data lines overlapping the fourteen touch electrodes TE, and thus, a description thereof will be omitted.

Each of the plurality of integrated driving ICs 900a to 900n according to an embodiment may be mounted on a pad portion of the display panel 100 through a chip mounting process.

Each of the plurality of integrated driving ICs 900a to 900n according to another embodiment may be mounted on a flexible circuit film by a chip mounting process. The flexible circuit film may be attached to the pad portion of the display panel 100 by a film attaching process.

In each of the plurality of integrated drive ICs 900a to 900n according to an embodiment, each of the first and second touch driving units TDP1 and TDP2 supplies an uplink signal to some of a plurality of touch groups and senses a downlink signal transmitted from a touch pen through the touch group in which the uplink signal was supplied, to generate pen touch raw data at every pen position sensing period of at least one of a plurality of pen sensing periods. Here, each of the first and second touch driving units TDP1 and TDP2 supplies a DC voltage (or a common voltage) to the remaining touch groups other than some of the plurality of touch groups at every pen position sensing period.

In this example, each of the plurality of touch groups according to an embodiment may include touch electrodes arranged on at least one horizontal line. In this case, each of the first and second touch driving units TDP1 and TDP2 according to an embodiment may sequentially supply an uplink signal to the plurality of touch groups in units of touch sensing periods (TP), i.e., in units of pen position sensing periods, as in the Nth frame illustrated in FIG. 7.

In this example, each of the plurality of touch groups according to another embodiment may be a vertical touch group having touch electrodes connected to each of the first and second touch driving units TDP1 and TDP2 of each of the plurality of integrated driving ICs. In this case, as in the Nth frame illustrated in FIG. 11, each of the first and second touch driving units TDP1 and TDP2 according to another embodiment may sequentially supply an uplink signal to a plurality of touch groups VTG in units of touch sensing periods (TP), i.e., in units of pen position sensing periods.

In this example, the touch electrodes TE respectively connected to the first and second touch driving units TDP1 and TDP2 according to another embodiment may be divided into a first touch group and a second touch group. The first touch group according to an embodiment may include touch electrodes arranged on odd-numbered vertical lines among a plurality of vertical lines respectively connected to the first and second touch driving units TDP1 and TDP2, and the second touch group may include touch electrodes arranged on even-numbered vertical lines among the plurality of vertical lines respectively connected to the first and second touch driving units TDP1 and TDP2. Accordingly, each of the first and second touch driving unit TDP1 TDP2 according to another embodiment may alternately supply the uplink signal to the first touch group TG1 and the second touch group TG2 in units of frames as illustrated in FIG. 13. Alternatively, each of the first and second touch driving units TDP1 and TDP2 may alternately supply the uplink signal to the first touch group TG1 and the second touch group TG2 in units of touch sensing periods TP, i.e., in units of pen position sensing periods. Selectively, as illustrated in FIG. 13, each of the first and second touch driving units TDP1 and TDP2 may alternately supply the uplink signal to the first touch group TG1 and the second touch group TG2 in units of frames and pen position sensing periods.

Selectively, the first touch group may include touch electrodes arranged on odd-numbered horizontal lines among the plurality of horizontal lines respectively connected to the first and second touch driving units TDP1 and TDP2, and the second touch group may include touch electrodes arranged on even-numbered horizontal lines among the plurality of horizontal lines respectively connected to the first and second touch driving units TDP1 and TDP2. Also, in this case, each of the first and second touch driving units TDP1 and TDP2 according to another embodiment may alternately supply the uplink signal to the first touch group TG1 and the second touch group TG2 in units of frames, pen position sensing periods, or frame and pen position sensing periods.

Figure 16:
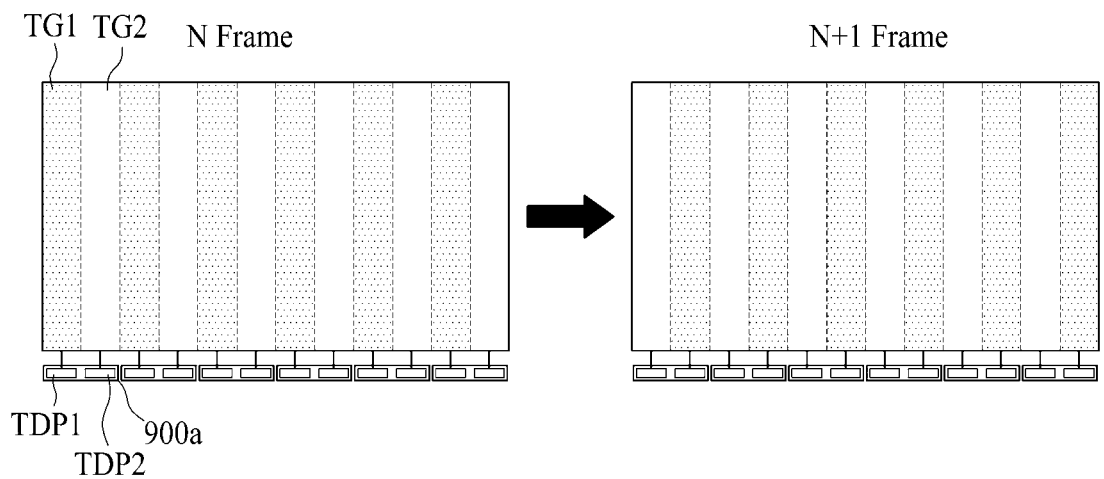
FIGS. 16 and 17 are diagrams illustrating sensing of a pen touch using a data/touch driving unit illustrated in FIG. 15.

In this example, as illustrated in FIG. 16, the plurality of touch electrodes TE provided in the display panel 100 may be divided into a first touch group TG1 connected to the first touch driving unit TDP1 and a second touch group TG2 connected to the second touch driving unit TDP2. In this case, each of the first touch driving unit TDP1 and the second touch driving units TDP2 according to another embodiment may alternately supply the uplink signal to the first touch group TG1 and the second touch group TG1 in units of touch sensing periods TP, i.e., in units of pen position sensing periods or frames.

For example, during the Nth frame, the first touch driving unit TDP1 may supply the uplink signal to the first touch group TG1 and the second touch driving unit TDP2 may supply a DC voltage (or a common voltage) to the second touch group TG2. Also, during the (N+1)th frame, the first touch driving unit TDP1 may supply the DC voltage (or the common voltage) to the first touch group TG1 and the second touch driving unit TDP2 may supply the uplink signal to the second touch group TG2. Here, the Nth frame may be an odd-numbered frame.

Figure 17:
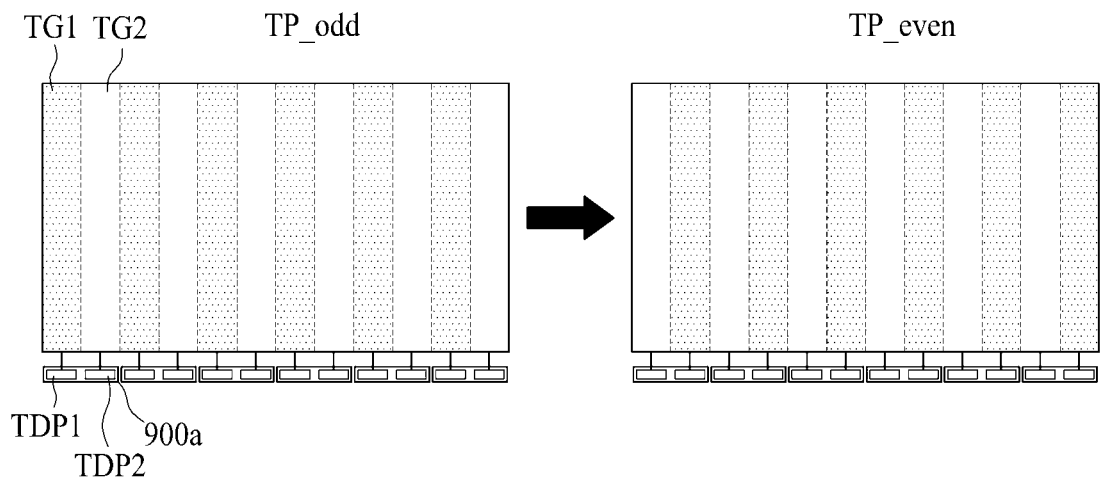

In another embodiment, as illustrated in FIG. 17, during the odd-numbered touch sensing period of the touch sensing period TP, the first touch driving unit TDP1 may supply the uplink signal to the first touch group TG1 and the second touch driving unit TDP2 may supply the DC voltage (or the common voltage) to the second touch group TG2. Also, during the even-numbered touch sensing period of the touch sensing period TP, the first touch driving unit TDP1 may supply the DC voltage (or the common voltage) to the first touch group TG1 and the second touch driving unit TDP2 may supply the uplink signal to the second touch group TG2.

In another example, during the odd-numbered touch sensing period of the Nth frame, the first touch driving unit TDP1 may supply the uplink signal to the first touch group TG1 and the second touch driving unit TDP2 may supply the DC voltage (or the common voltage) to the touch group TG2. During the even-numbered touch sensing period of the Nth frame, the first touch driving unit TDP1 may supply the DC voltage (or the common voltage) to the first touch group TG1 and the second touch driving unit TDP2 may supply the uplink signal to the second touch group TG2. During the odd-numbered touch sensing period of the (N+1)th frame, the first touch driving unit TDP1 may supply the DC voltage (or the common voltage) to the first touch group TG1 and the second touch driving unit TDP2 may supply the uplink signal to the second touch group TG2. Also, during the even-numbered touch sensing period of the (N+1)th frame, the first touch driving unit TDP1 may supply the uplink signal to the first touch group TG1 and the second touch driving unit TDP2 may supply the DC voltage (or the common voltage) to the second touch group TG2. Here, the Nth frame may be an odd-numbered frame.

In the display apparatus according to another embodiment of the present disclosure, each of the first and second touch driving units TDP1 and TDP2 provided in each of the plurality of integrated driving ICs 900a to 900n may supply the uplink signal only to the pen overlap touch group, i.e., the local touch group, corresponding to the pen tracking channel information at every pen position sensing period on the basis of touch control data including channel setting information having pen tracking channel information provided from the host controller and sense a downlink signal transmitted from a touch pen through the pen overlap touch group to generate a touch sensing signal. In this case, in this example, since the pen touch is sensed only through the sensing unit of the touch driving unit connected to the local touch group among the first and second touch driving units TDP1 and TDP2 provided in each of the plurality of integrated driving ICs 900a to 900n and the sensing units of the remaining touch driving units do not operate, power consumption of the display apparatus may be reduced. For example, in case where the data/touch driving unit 900 is composed of six integrated driving ICs, this example enables a sensing unit of one touch driving unit connected to the local touch group among a total of 12 touch driving units and disables the sensing units of the other remaining 11 touch driving units, thus reducing power consumption of the display apparatus.

In the display apparatus according to another embodiment of the present disclosure, since the plurality of touch electrodes are divided into a plurality of touch groups and a pen touch is sensed by supplying an uplink signal to some of the plurality of touch groups through the first and second touch driving units TDP1 and TDP2 provided in each of the plurality of integrated driving ICs 900a to 900n, attenuation of the uplink signal transmitted to the touch pen from the user's hand or palm that touches the display panel may be minimized, whereby the pen touch may be sensed even when the user's hand or palm touches the display panel.

Figure 18:
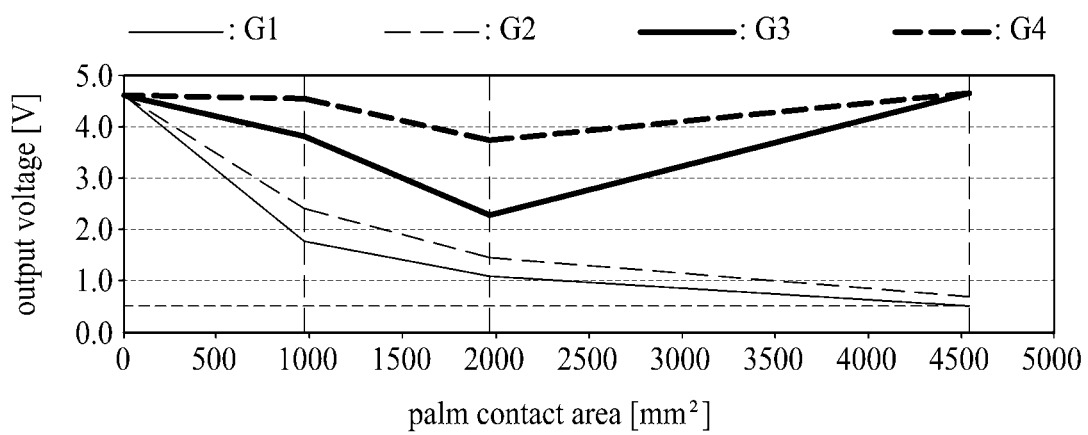
FIG. 18 is a graph illustrating output voltages in touch pens regarding contact areas of the palm with respect to display panels in a display apparatus according to the present disclosure example and a display apparatus according to a comparative example.

FIG. 18 is a graph illustrating an output voltage in a touch pen with respect to a contact area of the palm on the display panel in the display apparatus according to the example of the present disclosure and a display apparatus according to a comparative example. In FIG. 18, the horizontal axis represents a contact area of the palm with respect to the display panel, and the vertical axis represents an output voltage of a receiving unit (hereinafter, referred to as a 'pen receiving unit') installed in the touch pen. In FIG. 18, a first graph G1 (thin solid line) represents an output voltage of a pen receiving unit measured by supplying the uplink signal to all of the plurality of touch electrodes and positioning the touch pen at the edge portion of the display panel according to a comparative example, a second graph G2 (thin dotted line) represents an output voltage of a pen receiving unit measured by supplying the uplink signal to all of the plurality of touch electrodes and positioning the touch pen at the central portion of the display panel according to the comparative example, a third graph G3 (thick solid line) represents an output voltage of a pen receiving unit measured by supplying the uplink signal only to touch electrodes included in some of touch groups among a plurality of touch electrodes and positioning the touch pen at the edge portion of the display panel according to an inventive example of the present disclosure, and a fourth graph G4 (thick dotted line) represents an output voltage of a pen receiving unit measured by supplying the uplink signal only to touch electrodes included in some of touch groups among a plurality of touch electrodes and positioning the touch pen at the central portion of the display panel according to the inventive example of the present disclosure.

As can be seen from the first and second graphs G1 and G2 of FIG. 18, the comparative example shows that the output voltages of the receiving unit decreases as the palm area with respect to the display panel increases, and in particular, in case where the palm area with respect to the display panel is equal to or greater than 4500 $mm^2$, the uplink signal may not be recognized by the touch pen due to attenuation of the uplink signal through the palm.

In contrast, as can be seen from the third and fourth graphs G3 and G4 in FIG. 18, the inventive example of the present disclosure shows that the attenuation ratio of the uplink signal through the palm is reduced by twice or greater as compared with the comparative example although the palm area with respect to the display panel is increased.

Therefore, in the present disclosure, since the plurality of touch electrodes are divided into a plurality of touch groups and the uplink signal is transmitted to the touch pen through sequential driving or partitioned driving of the plurality of touch groups, attenuation of the uplink signal due to the user's hand or palm that touches the display panel may be minimized, whereby even when the user's hand or palm touches the display panel, the position of the touch pen positioned on the display panel may be sensed and a touch drawing may be seamlessly sensed by sensing a pen touch, while tracking the position of the touch pen on the basis of the position of the touch pen.

The display apparatus according to the present disclosure may be used as a display screen of a smartphone, a mobile communication terminal, a mobile phone, a personal computer, a smart watch, a watch phone, a wearable device, an electronic notebook, an electronic book, a portable multimedia player (PMP), a navigation device, a television, a notebook, a monitor, a camera, a camcorder, a home appliance, and the like.

The display apparatus according to the present disclosure may minimize attenuation of the uplink signal due to the user's hand or palm that touches the display panel, whereby even when the user's hand or palm touches the display panel, the position of the touch pen positioned on the display panel may be sensed and a touch drawing may be seamlessly sensed by sensing a pen touch, while tracking the position of the touch pen.

The above-described feature, structure, and effect of the present disclosure are included in at least one embodiment of the present disclosure, but are not limited to only one embodiment. Furthermore, the feature, structure, and effect described in at least one embodiment of the present disclosure may be implemented through combination or modification of other embodiments by those skilled in the art. Therefore, content associated with the combination and modification should be construed as being within the scope of the present disclosure.

It will be apparent to those skilled in the art that various modifications and variations may be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A display apparatus comprising:
a display panel comprising a plurality of touch electrodes arranged in a plurality of rows and a plurality of columns and a plurality of touch lines, each of the plurality of touch lines connected to a corresponding one of the plurality of touch electrodes; and
a touch driving circuit dividing the plurality of touch electrodes into a plurality of touch groups that each include a set of touch electrodes from the plurality of touch electrodes, supplying a common voltage to the plurality of touch electrodes at each of a plurality of display periods during which an image is displayed on the display panel via the plurality of touch lines connected to the plurality of touch electrodes, and sensing a position of a touch pen at each of a plurality of pen position sensing periods,
wherein during one or more of the plurality of pen position sensing periods, the touch driving circuit supplies an uplink signal to the set of touch electrodes of one of the plurality of touch groups that corresponds with the one or more pen position sensing periods via a set of touch lines from the plurality of touch lines that are connected to the set of touch electrodes, senses a touch of the touch pen based on a capacitance variation at the set of touch electrodes supplied with the uplink signal, and senses a downlink signal transmitted from the touch pen in response to the uplink signal,
wherein the touch driving circuit generates pen touch raw data based on the downlink signal, the pen touch raw data indicative of the position of the touch pen during the one or more of the plurality of pen position sensing periods, the pen touch raw data indicative of the position of the touch pen during the one or more of the plurality of pen position sensing periods, and
wherein the touch driving circuit supplies a direct current (DC) voltage or the common voltage to a remaining set of touch electrodes of remaining touch groups from the plurality of touch groups other than the set of touch electrodes of the touch group supplied with the uplink signal at every pen position sensing period, the DC voltage or the common voltage supplied to the remaining set of touch electrodes via a remaining set of touch lines from the plurality of touch lines that are connected to the remaining set of touch electrodes.

2. The display apparatus of claim 1, wherein,
each of the plurality of touch groups comprises a respective set of multiple touch electrodes arranged on a corresponding one horizontal row or a corresponding one vertical column, and
the touch driving circuit sequentially supplies the uplink signal to each of the plurality of touch groups during the pen position sensing periods.

3. The display apparatus of claim 1, further comprising:
a host controller calculating pen position information based on the pen touch raw data and providing pen tracking channel information regarding a touch group corresponding to the pen position information among the plurality of touch groups to the touch driving circuit,
wherein at one or more pen position sensing periods the touch driving circuit supplies an uplink signal to a pen overlap touch group corresponding to the pen tracking channel information, senses a downlink signal transmitted from the touch pen through the pen overlap touch group to generate a touch sensing signal, converts the generated touch sensing signal into pen touch raw data, and provides the converted pen touch raw data to the host controller.

4. The display apparatus of claim 3, wherein the pen overlap touch group is a local touch group comprising a set of touch electrodes within a horizontal touch group having touch electrodes arranged on at least one horizontal line or within a vertical touch group having touch electrodes arranged on at least one vertical line.

5. The display apparatus of claim 1, further comprising a voltage selecting unit mounted on a printed circuit board and selectively supplying the uplink signal and the DC voltage or the common voltage to the touch driving circuit.

6. A display apparatus comprising:
a display panel comprising a plurality of touch electrodes arranged in a plurality of rows and a plurality of columns and a plurality of touch lines, each of the plurality of touch lines connected to a corresponding one of the plurality of touch electrodes; and
a touch driving circuit divides the plurality of touch electrodes into at least a first touch group and a second touch group that each include a respective set of touch electrodes from the plurality of touch electrodes, and supplying a common voltage to the plurality of touch electrodes at each of a plurality of display periods during which an image is displayed on the display panel via the plurality of touch lines connected to the plurality of touch electrodes,
wherein the touch driving circuit alternately supplies an uplink signal to the set of touch electrodes of the first touch group via a first set of touch lines from the plurality of touch lines that are connected to the set of touch electrodes of the first touch group and to the set of touch electrodes of the second touch group via a second set of touch lines from the plurality of touch lines that are connected to the set of touch electrodes of the second touch group in units of frames or in units of pen position sensing periods, and a touch of the touch pen is sensed based on a capacitance variation at the set of touch electrodes supplied with the uplink signal,
wherein the touch driving circuit generates pen touch raw data, the pen touch raw data indicative of the position of the touch pen during the pen position sensing periods,
wherein the touch driving circuit supplies a direct current (DC) voltage or the common voltage to the first touch group via the first set of touch lines when the second touch group is supplied with the uplink signal via the second set of touch lines, and supplies the direct current (DC) voltage or the common voltage to the second touch group via the second set of touch lines when the first touch group is supplied with the uplink signal via the first set of touch lines.

7. The display apparatus of claim 6, wherein
the first touch group comprises touch electrodes arranged on odd-numbered horizontal rows among the plurality of horizontal rows, and
the second touch group comprises touch electrodes arranged on even-numbered horizontal lines among the plurality of horizontal lines.

8. The display apparatus of claim 6, wherein,
the first touch group comprises touch electrodes arranged on odd-numbered vertical columns among the plurality of vertical columns, and the second touch group comprises touch electrodes arranged on even-numbered vertical columns among the plurality of vertical columns.

9. The display apparatus of claim 6, wherein the touch driving circuit senses the pen touch based on a capacitance variation between the set of touch electrodes of the first group responsive to the set of touch electrodes in the first touch group receiving the uplink signal, and senses the pen touch based on a capacitance variation between the set of touch electrodes of the second group responsive to the set of touch electrodes in the second touch group receiving the uplink signal.

10. A display apparatus comprising:
a display panel comprising a plurality of touch electrodes arranged in a plurality of rows and a plurality of columns, a plurality of gate lines overlapping the plurality of touch electrodes, a plurality of data lines intersecting the plurality of gate lines, and a plurality of touch lines, each of the plurality of touch lines connected to a corresponding one of the plurality of touch electrodes; and
a data/touch driving unit connected to the plurality of touch electrodes and the plurality of data lines, dividing the plurality of touch electrodes into a plurality of touch groups that each include a set of touch electrodes from the plurality of touch electrodes, supplying a common voltage to the plurality of touch electrodes at each of a plurality of display periods during which an image is displayed on the display panel via the plurality of touch lines connected to the plurality of touch electrodes, and sensing a position of a touch at each of a plurality of pen position sensing periods,
wherein during one or more of the plurality of pen position sensing periods, the data/touch driving unit supplies an uplink signal to the set of touch electrodes of one of the plurality of touch groups that corresponds with the one or more pen position sensing periods via a set of touch lines from the plurality of touch lines that are connected to the set of touch electrodes, senses a touch of the touch pen based on a capacitance variation at the set of touch electrodes supplied with the uplink signal, and senses a downlink signal transmitted from the touch pen in response to the uplink signal,
wherein the touch driving circuit generates pen touch raw data based on the downlink signal, the pen touch raw data indicative of the position of the touch pen during the one or more of the plurality of pen position sensing periods, and
wherein the data/touch driving unit supplies a direct current (DC) voltage or the common voltage to a remaining set of touch electrodes of remaining touch groups other than a touch group supplied with the uplink signal at every pen position sensing period, the DC voltage or the common voltage supplied to the remaining set of touch electrodes via a remaining set of touch lines from the plurality of touch lines that are connected to the remaining set of touch electrodes.

11. The display apparatus of claim 10, wherein
the data/touch driving unit further comprises a plurality of integrated driving integrated circuits (ICs), and
each of the plurality of integrated driving ICs comprises:
a first touch driving unit connected to touch electrodes arranged on a first set of columns among the plurality of columns;
a second touch driving unit connected to touch electrodes arranged on a second set of columns among the plurality of columns, wherein the second set of columns is adjacent to the first set of columns; and
a data driving unit connected to data lines overlapping touch electrodes arranged on the first set of columns and the second set of columns,
wherein each of the first and second touch driving units supplies the uplink signal to the set of touch electrodes of the one of the plurality of touch groups that corresponds with the one or more pen position sensing periods, senses a touch of the touch pen through the set of touch electrodes supplied with the uplink signal, and senses a downlink signal transmitted from the touch pen in response to the uplink signal, and generates pen touch raw data based on the downlink signal.

12. The display apparatus of claim 11, wherein each of the first and second touch driving units supplies the direct current (DC) voltage or the common voltage to remaining touch groups other than a touch group supplied with the uplink signal at every pen position sensing period.

13. The display apparatus of claim 12, wherein
each of the plurality of touch groups comprises touch electrodes arranged on at least one row, and
each of the first touch driving unit and the second touch driving unit sequentially supplies the uplink signal to the plurality of touch groups in units of the pen position sensing periods.

14. The display apparatus of claim 11, wherein
the touch electrodes connected to the first touch driving unit and the second touch driving unit are divided into a first touch group and a second touch group, and
the first touch driving unit and the second touch driving unit alternately supply the uplink signal to the first touch group via a first set of touch lines from the plurality of touch lines that are connected to touch electrodes of the first touch group and the second touch group via a second set of touch lines from the plurality of touch lines that are connected to touch electrodes of the second touch group in units of frames or in units of pen position sensing periods.

15. The display apparatus of claim 14, wherein
the first touch group comprises touch electrodes connected to the first touch driving unit and the second touch driving unit arranged on odd-numbered rows among the plurality of rows, and
the second touch group comprises touch electrodes connected to the first touch driving unit and the second touch driving unit arranged on even-numbered rows among the plurality of rows.

16. The display apparatus of claim 14, wherein
the first touch group comprises touch electrodes connected to the first touch driving unit and the second touch driving unit arranged on odd-numbered columns among the plurality of columns, and
the second touch group comprises touch electrodes connected to each of the first touch driving unit and the second touch driving unit arranged on even-numbered columns among the plurality of columns.

17. The display apparatus of claim 11, wherein
each of the plurality of touch groups comprises touch electrodes connected to the first touch driving unit and the second touch driving unit of each of the plurality of integrated driving ICs, and
the uplink signal is sequentially supplied to the plurality of touch groups in units of the pen position sensing periods.

18. The display apparatus of claim 11, wherein
the plurality of touch electrodes are divided into a first touch group connected to the first touch driving unit and a second touch group connected to the second touch driving unit, and
each of the first and second touch driving units alternately supplies the uplink signal to the first touch group and the second touch group in units of frames or in units of the pen position sensing periods.

19. The display apparatus of any one of claim 11, wherein
a host controller calculates pen position information on the basis of the pen touch raw data provided from the data/touch driving unit and provides pen tracking channel information regarding a touch group among the plurality of touch groups corresponding to the pen position information to the data/touch driving unit,
and wherein at one or more pen position sensing periods the data/touch driving unit supplies an uplink signal to a pen overlap touch group corresponding to the pen tracking channel information, senses a downlink signal transmitted from the touch pen through the pen overlap touch group to generate a touch sensing signal, converts the generated touch sensing signal into pen touch raw data, and provides the converted pen touch raw data to the host controller.

20. The display apparatus of claim 16, wherein the pen overlap touch group is a local touch group comprising a set of touch electrodes within a horizontal touch group having touch electrodes arranged on at least one horizontal line or a vertical touch group having touch electrodes arranged on at least one vertical line.

21. The display apparatus of any one of claim 12, further comprising a voltage selecting unit mounted on a printed circuit board and selectively supplying the uplink signal and the DC voltage or the common voltage to the first touch driving unit and the second touch driving unit of each of the plurality of integrated driving ICs.

* * * * *